United States Patent
Godfrey et al.

(10) Patent No.: US 8,447,980 B2
(45) Date of Patent: *May 21, 2013

(54) SYSTEM AND METHOD FOR PROCESSING ENCODED MESSAGES FOR EXCHANGE WITH A MOBILE DATA COMMUNICATION DEVICE

(75) Inventors: James A. Godfrey, Waterloo (CA); Herbert A. Little, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 463 days.

This patent is subject to a terminal disclaimer.

(21) Appl. No.: 12/693,021

(22) Filed: Jan. 25, 2010

(65) Prior Publication Data

US 2010/0124333 A1 May 20, 2010

Related U.S. Application Data

(63) Continuation of application No. 10/480,514, filed as application No. PCT/CA02/00890 on Jun. 12, 2002, now Pat. No. 7,653,815.

(60) Provisional application No. 60/297,681, filed on Jun. 12, 2001.

(51) Int. Cl.
*H04L 9/32* (2006.01)

(52) U.S. Cl.
USPC ............................ 713/170; 713/150; 380/270

(58) Field of Classification Search
None
See application file for complete search history.

(56) References Cited

U.S. PATENT DOCUMENTS

| | | | |
|---|---|---|---|
| 4,028,500 A | 6/1977 | McClure et al. | |
| 5,410,602 A | 4/1995 | Finkelstein et al. | |
| 5,457,748 A | 10/1995 | Bergum et al. | |
| 5,623,546 A | 4/1997 | Hardy et al. | |

(Continued)

FOREIGN PATENT DOCUMENTS

| CA | 2476914 | 2/2006 |
|---|---|---|
| CA | 2450631 | 9/2011 |

(Continued)

OTHER PUBLICATIONS

Response to Office Action from USPTO dated Jan. 3, 2007 for U.S. Appl. No. 10/480,613.

(Continued)

*Primary Examiner* — Pramila Parthasarathy
(74) *Attorney, Agent, or Firm* — Bereskin & Parr LLP/S.E.N.C.R.L., s.r.l.

(57) ABSTRACT

A system and method are provided for pre-processing encrypted and/or signed messages at a host system before the message is transmitted to a wireless mobile communication device. The message is received at the host system from a message sender. There is a determination as to whether any of the message receivers has a corresponding wireless mobile communication device. For each message receiver that has a corresponding wireless mobile communication device, the message is processed so as to modify the message with respect to one or more encryption and/or authentication aspects. The processed message is transmitted to a wireless mobile communication device that corresponds to the first message receiver. The system and method may include post-processing messages sent from a wireless mobile communications device to a host system. Authentication and/or encryption message processing is performed upon the message. The processed message may then be sent through the host system to one or more receivers.

20 Claims, 19 Drawing Sheets

U.S. PATENT DOCUMENTS

| | | | |
|---|---|---|---|
| 5,666,530 A | 9/1997 | Clark et al. | |
| 5,710,922 A | 1/1998 | Alley | |
| 5,727,202 A | 3/1998 | Kucala | |
| 5,778,068 A | 7/1998 | Johnson et al. | |
| 5,778,346 A | 7/1998 | Frid-Nielsen | |
| 5,812,671 A | 9/1998 | Ross | |
| 5,870,030 A | 2/1999 | DeLuca et al. | |
| 5,956,707 A | 9/1999 | Chu | |
| 5,991,399 A | 11/1999 | Graunke et al. | |
| 6,000,000 A | 12/1999 | Hawkins | |
| 6,061,448 A | 5/2000 | Smith et al. | |
| 6,073,237 A | 6/2000 | Ellison | |
| 6,081,601 A | 6/2000 | Raivisto | |
| 6,084,969 A | 7/2000 | Wright et al. | |
| 6,085,323 A | 7/2000 | Shimizu et al. | |
| 6,108,788 A | 8/2000 | Moses et al. | |
| 6,119,228 A | 9/2000 | Angelo et al. | |
| 6,125,369 A | 9/2000 | Wu | |
| 6,209,098 B1 | 3/2001 | Davis | |
| 6,219,694 B1 | 4/2001 | Lazaridis | |
| 6,229,894 B1 | 5/2001 | Van Oorschot et al. | |
| 6,230,186 B1 | 5/2001 | Yaker | |
| 6,231,985 B1 | 5/2001 | Jones et al. | |
| 6,266,420 B1 | 7/2001 | Langford et al. | |
| 6,266,775 B1 | 7/2001 | Kamba | |
| 6,289,105 B1 | 9/2001 | Murota | |
| 6,301,658 B1 | 10/2001 | Koehler | |
| 6,313,732 B1 | 11/2001 | DeLuca et al. | |
| 6,348,972 B1 | 2/2002 | Taniguchi et al. | |
| 6,389,455 B1 | 5/2002 | Fuisz | |
| 6,531,985 B1 | 3/2003 | Jones | |
| 6,564,320 B1 | 5/2003 | de Silva et al. | |
| 6,591,367 B1* | 7/2003 | Kobata et al. | 726/31 |
| 6,661,927 B1 | 12/2003 | Suarez et al. | |
| 6,697,942 B1 | 2/2004 | L'Heureux et al. | |
| 6,708,200 B1 | 3/2004 | Ura | |
| 6,732,144 B1 | 5/2004 | Kizu et al. | |
| 6,744,874 B2 | 6/2004 | Wu | |
| 6,745,024 B1 | 6/2004 | DeJaco et al. | |
| 6,779,115 B1 | 8/2004 | Naim | |
| 6,819,766 B1 | 11/2004 | Weidong | |
| 6,829,357 B1 | 12/2004 | Alrabady et al. | |
| 6,904,521 B1 | 6/2005 | Jivsov | |
| 6,918,038 B1 | 7/2005 | Smith et al. | |
| 6,925,568 B1 | 8/2005 | Heinonen | |
| 6,931,532 B1 | 8/2005 | Davis et al. | |
| 6,983,367 B2 | 1/2006 | Go et al. | |
| 6,993,137 B2 | 1/2006 | Franksdonk | |
| 6,996,720 B1 | 2/2006 | DeMello et al. | |
| 7,003,667 B1 | 2/2006 | Slick et al. | |
| 7,020,708 B2 | 3/2006 | Nelson et al. | |
| 7,032,240 B1 | 4/2006 | Cronce et al. | |
| 7,113,927 B1 | 9/2006 | Tanaka et al. | |
| 7,127,604 B2 | 10/2006 | Lide et al. | |
| 7,171,552 B1 | 1/2007 | Bell | |
| 7,200,749 B2 | 4/2007 | Wheeler et al. | |
| 7,228,418 B1 | 6/2007 | Girault | |
| 7,254,712 B2 | 8/2007 | Godfrey et al. | |
| 7,299,502 B2 | 11/2007 | Schmeling et al. | |
| 7,529,374 B2 | 5/2009 | Huttunen | |
| 7,546,453 B2 | 6/2009 | Little et al. | |
| 7,613,182 B2 | 11/2009 | Lecomte et al. | |
| 7,653,815 B2 | 1/2010 | Godfrey et al. | |
| 7,657,736 B2 | 2/2010 | Godfrey et al. | |
| 7,827,406 B2 | 11/2010 | Brown | |
| 8,205,084 B2 | 6/2012 | Godfrey et al. | |
| 8,291,212 B2 | 10/2012 | Godfrey et al. | |
| 2001/0011308 A1 | 8/2001 | Clark et al. | |
| 2001/0046307 A1 | 11/2001 | Wong | |
| 2001/0050990 A1 | 12/2001 | Sudia | |
| 2002/0007453 A1 | 1/2002 | Nemovicher | |
| 2002/0032861 A1 | 3/2002 | Azuma | |
| 2002/0035685 A1 | 3/2002 | Ono et al. | |
| 2002/0035687 A1 | 3/2002 | Skantze | |
| 2002/0038420 A1 | 3/2002 | Collins et al. | |
| 2002/0051544 A1 | 5/2002 | Kikuchi et al. | |
| 2002/0053023 A1 | 5/2002 | Patterson et al. | |
| 2002/0053032 A1 | 5/2002 | Dowling et al. | |
| 2002/0059375 A1 | 5/2002 | Pivowar et al. |
| 2002/0059383 A1 | 5/2002 | Katsuda |
| 2002/0080752 A1 | 6/2002 | Johansson et al. |
| 2002/0099766 A1 | 7/2002 | Tuli |
| 2002/0147905 A1 | 10/2002 | Perlman |
| 2002/0165967 A1 | 11/2002 | Morgan |
| 2002/0169954 A1 | 11/2002 | Bandini et al. |
| 2002/0173295 A1 | 11/2002 | Nykanen et al. |
| 2002/0176067 A1 | 11/2002 | Charbon |
| 2003/0002671 A1 | 1/2003 | Inchalik et al. |
| 2003/0074555 A1 | 4/2003 | Fahn et al. |
| 2003/0126085 A1 | 7/2003 | Srinivasan |
| 2003/0172122 A1 | 9/2003 | Little et al. |
| 2003/0198350 A1 | 10/2003 | Foster et al. |
| 2003/0212888 A1 | 11/2003 | Wildish et al. |
| 2004/0083364 A1 | 4/2004 | Andreaux et al. |
| 2004/0093493 A1 | 5/2004 | Bisbee et al. |
| 2004/0133520 A1 | 7/2004 | Callas et al. |
| 2004/0133775 A1 | 7/2004 | Callas et al. |
| 2004/0196978 A1 | 10/2004 | Godfrey et al. |
| 2004/0202327 A1 | 10/2004 | Little |
| 2004/0205248 A1 | 10/2004 | Little et al. |
| 2004/0205330 A1 | 10/2004 | Godfrey et al. |
| 2005/0005097 A1 | 1/2005 | Murakawa |
| 2005/0039100 A1 | 2/2005 | Bade et al. |
| 2005/0114671 A1 | 5/2005 | Little et al. |
| 2005/0148323 A1 | 7/2005 | Little et al. |
| 2005/0149442 A1 | 7/2005 | Adams et al. |
| 2005/0163320 A1 | 7/2005 | Brown et al. |
| 2005/0188219 A1 | 8/2005 | Annic et al. |
| 2005/0203855 A1 | 9/2005 | Malcolm |
| 2005/0210289 A1 | 9/2005 | Brown |
| 2005/0222991 A1 | 10/2005 | Ikenoya |
| 2005/0246763 A1 | 11/2005 | Corcoran et al. |
| 2006/0015722 A1 | 1/2006 | Rowan et al. |
| 2006/0036848 A1 | 2/2006 | Brown et al. |
| 2006/0036849 A1 | 2/2006 | Brown et al. |
| 2006/0036865 A1 | 2/2006 | Brown et al. |
| 2006/0059332 A1 | 3/2006 | Adams et al. |
| 2007/0083749 A1 | 4/2007 | Fang |
| 2007/0118874 A1 | 5/2007 | Adams et al. |
| 2007/0123307 A1 | 5/2007 | Adams et al. |
| 2007/0165844 A1 | 7/2007 | Little et al. |
| 2008/0016359 A1 | 1/2008 | Godfrey et al. |
| 2010/0115264 A1 | 5/2010 | Godfrey et al. |
| 2010/0122089 A1 | 5/2010 | Godfrey et al. |
| 2010/0124333 A1 | 5/2010 | Godfrey et al. |

FOREIGN PATENT DOCUMENTS

| | | |
|---|---|---|
| CN | ZL02815759.1 | 1/2012 |
| EP | 0500222 | 8/1992 |
| EP | 0500245 | 8/1992 |
| EP | 0841770 | 5/1998 |
| EP | 0942568 | 9/1999 |
| EP | 1096725 | 5/2001 |
| EP | 1096727 | 5/2001 |
| EP | 1119132 | 7/2001 |
| EP | 1580953 | 9/2005 |
| EP | 1806683 | 7/2007 |
| GB | 2328125 | 2/1999 |
| JP | 06-276221 | 9/1994 |
| JP | 07-162407 | 6/1995 |
| JP | 7-509333 | 10/1995 |
| JP | 8-251221 | 9/1996 |
| JP | 09-046330 | 2/1997 |
| JP | 10-22992 | 1/1998 |
| JP | 10-107832 | 4/1998 |
| JP | 11-272581 | 10/1999 |
| JP | 11-272582 | 10/1999 |
| JP | 2000-10477 | 1/2000 |
| JP | 2001-69137 | 3/2001 |
| JP | 2001-103571 | 4/2001 |
| JP | 2001-197055 | 7/2001 |
| JP | 2001-237821 | 8/2001 |
| JP | 2002-535884 | 10/2002 |
| JP | 2004-048139 | 2/2004 |
| KR | 1020030059303 | 7/2003 |
| WO | 94/12938 | 6/1994 |
| WO | 96/36934 | 11/1996 |

| | | |
|---|---|---|
| WO | 9741661 | 11/1997 |
| WO | 9834374 | 8/1998 |
| WO | 99/05814 | 2/1999 |
| WO | 99/06900 | 2/1999 |
| WO | 99/17564 | 4/1999 |
| WO | 99/27678 | 6/1999 |
| WO | 99/63709 | 12/1999 |
| WO | 99/64946 | 12/1999 |
| WO | 00/31931 | 6/2000 |
| WO | 00/72506 | 11/2000 |
| WO | 0069114 | 11/2000 |
| WO | 01/01644 | 1/2001 |
| WO | 01/16933 | 3/2001 |
| WO | 0124434 | 4/2001 |
| WO | 01/41353 | 6/2001 |
| WO | 01-63386 | 8/2001 |
| WO | 0171608 | 9/2001 |
| WO | 01/78491 | 10/2001 |
| WO | 02/102009 | 6/2002 |
| WO | 02-101580 | 12/2002 |
| WO | 03/005636 | 1/2003 |
| WO | 03/009561 | 1/2003 |
| WO | 03/079627 | 9/2003 |
| WO | 03/079628 | 9/2003 |

OTHER PUBLICATIONS

Office Action from USPTO dated Aug. 7, 2008 for U.S. Appl. No. 11/776,099.
Response to Office Action from USPTO dated Jan. 7, 2009 for U.S. Appl. No. 11/776,099.
Notice of Allowance from USPTO dated May 15, 2009 for U.S. Appl. No. 11/776,099.
Request for Continued Examination (RCE) dated Aug. 17, 2009 for U.S. Appl. No. 11/776,099.
Notice of Allowance from USPTO dated Sep. 10, 2009 for U.S. Appl. No. 11/776,099.
First Office Action, Chinese Application No. 02815759.1, dated Dec. 26, 2008.
Second Office Action, Chinese Application No. 02815759.1, dated Aug. 6, 2010.
Third Office Action, Chinese Application No. 02815759.1, dated May 18, 2011.
Office Action from CIPO, Canadian Application No. 2,450,601 dated Jan. 6, 2009.
Office Action from CIPO, Canadian Application No. 2,450,601 dated Jul. 27, 2011.
EPO Communication Pursuant to Article 96(2) EPC, in connection with Application No. 02734959.6-2201, dated Apr. 28, 2004.
EPO Communication Pursuant to Article 96(2) EPC, in connection with Application No. 02734959.6-2201, dated Jul. 26, 2005.
Summons to Attend Oral Proceedings Pursuant to Rule 115(1) EPC, in connection with Application No. 02734959.6-2201, dated May 8, 2009.
Provision of the minutes in accordance with Rule 124(4) EPC, in connection with Application No. 02734959.6-2201, dated Aug. 20, 2009.
Decision to refuse a European Patent application, in connection with Application No. 02734959.6-2201, dated Aug. 20, 2009.
Extended European Search Report Pursuant to Rule 62 EPC, in connection with Application No. 09166522.4-2201, dated Feb. 8, 2010.
EPO Communication Pursuant to Rule 70(2) EPC and reference to Rule 39(1) EPC), in connection with Application No. 09166522.4-2201, dated Mar. 15, 2010.
Office Action for Japanese Application No. 2003-504294, dated May 17, 2006 (mailed May 19, 2006).
Office Action for Japanese Application No. 2003-504294, dated Sep. 25, 2006 (mailed Sep. 27, 2006).
Notice of Allowance, Japanese Application No. 2003-504294, dated Feb. 2, 2007.
Office Action, Korean Application No. 2003-7016486, dated May 26, 2005.
Notice of Allowance (Decision for Patent), Korean Application No. 2003-7016486, dated Dec. 28, 2005.
Certificate of Grant of Patent, Singapore Patent Application No. 200307400-2, dated Dec. 30, 2005.
Notification Prior to Examination, Israeli Application No. 159342, dated Jun. 24, 2007.
International Preliminary Examination Report for PCT/CA02/00890 dated Sep. 17, 2003.
Office Action from USPTO dated Sep. 15, 2011 for U.S. Appl. No. 12/691,204.
First Examination Report, Indian Application No. 2174/DELNP/2003, dated Jun. 3, 2005.
Intimation of Grant, Indian Application No. 2174/DELNP/2003 dated Mar. 6, 2006.
International Search Report for PCT/CA02/00889 mailed Dec. 13, 2002.
Written Opinion issued on Jan. 21, 2003 by European Patent Office for PCT/CA02/00889.
Written Opinion issued on May 26, 2003 by European Patent Office for PCT/CA02/00889.
International Preliminary Examination Report for PCT/CA02/00889 dated Sep. 11, 2003.
International Search Report for PCT/CA02/00890 mailed Dec. 23, 2002.
Written Opinion issued on Jan. 21, 2003 by European Patent Office for PCT/CA02/00890.
Written Opinion issued on May 27, 2003 by European Patent Office for PCT/CA02/00890.
Co-pending U.S. Appl. No. 11/089,869 entitled "System and Method for Processing Encoded Messages for Exchange With a Mobile Data Communication Device", filed Mar. 25, 2005.
Co-pending U.S. Appl. No. 12/686,046 entitled "System and Method for Processing Encoded Messages for Exchange with a Mobile Data Communication Device", filed Jan. 12, 2010.
Co-pending U.S. Appl. No. 10/480,613 entitled "System and Method for Compressing Secure E-Mail for Exchange With a Mobile Data Communication Device", filed Dec. 11, 2003.
Co-pending U.S. Appl. No. 12/691,204 entitled "System and Method for Compressing Secure E-Mail for Exchange With a Mobile Data Communication Device", filed Jan. 21, 2010.
Co-pending U.S. Appl. No. 11/776,099 entitled "System and Method for Compressing Secure E-Mail for Exchange With a Mobile Data Communication Device", filed Jul. 11, 2007.
Co-pending U.S. Appl. No. 12/916,929 entitled "System and Method for Processing Encoded Messages for Exchange With a Mobile Data Communication Device", filed Nov. 1, 2010.
Co-pending U.S. Appl. No. 10/480,514 entitled "System and Method for Processing Encoded Messages for Exchange With a Mobile Data Communication Device ", filed Dec. 11, 2003.
Levien: "Protecting Internet E-Mail From Prying Eyes," Data Communications, McGraw Hill, New York, US, vol. 25, No. 6 (May 1, 1996), pp. 117-118, 120, 122, XP 000587586.
Syverson: "Limitations on Design Principles for Public Key Protocols," Security and Privacy, 1996 Proceedings, 1996 IEEE Symposium on Oakland, CA, USA, May 6-8, 1996, Los Alamitos, CA, USA, IEEE Comput. Soc., US, May 6, 1996, pp. 62-72, XP010164926.
Gong et al.: "Multicast Security and its Extension to a Mobile Environment," SRI International, Computer Science Laboratory, J.C. Baltzer AG, Science Publishers, Wireless Networks I (1995) pp. 281-295.
Brown I., et al.: "A Proxy Approach to E-Mail Security", Software Practice & Experience, John Wiley & Sons Ltd. Chichester, GB, vol. 29, No. 12, Oct. 1999, pp. 1049-1060, XP000852351.
Subramanyam V., et al.: "Security in mobile systems", Reliable Distributed Systems, 1998 Proceedings. 17th IEEE Symposium on W. Lafayette, IN, USA, Oct. 20-23, 1998, Los Alamitos, CA, USA, IEEE Comput. Soc., US, Oct. 20, 1998, pp. 407-412, XP010319125.
International Search Report of Application No. PCT/CA02/00890, date of mailing Dec. 23, 2002—12 pgs.
Lai, M.K.E., et al.: "A Mobile Subscriber Proxy Preserving Writer-to-Reader Message Security", Military Communications Conference, 1996, Milcom '96, Conference Proceedings, IEEE McLean, VA, USA Oct. 21-24, 1996, New York, NY, USA, IEEE, US, Oct. 21, 1996, pp. 461-467, XP010203896.

Cole R., et al: "An Acrhitecture for a Mobile OSI Mail Access System", IEEE Journal on Selected Areas in Communications, IEEE Inc., New York, US, vol. 7, No. 2, Feb. 1989, pp. 249-256, XP000904914.

Harris A.: "Content Privacy and Content Security Working Together", Internet Article. Content Technologies White Paper, 'Online! Sep. 1999, XP002223158, pp. 8-9.

Torvinen V.: "Wireless PKI: Fundamentals", Internet Article, Radicchio White Paper, 'Online! 2000, XP002223159, pp. 12-13.

Mambo M., et al: "Proxy Signatures: Delegation of the Power to Sign Messages" IEICE Transactions on Fundamentals of Electronics, Communications and Computer Sciences, IEICE Tokyo, JP, vol. E79-A, No. 9, Sep. 1, 1996, pp. 1338-1353, XP000679624.

Brown M., et al.: "PGP in Constrained Wireless Devices", Proceedings of the 9th Usenix Security Symposium, Denver, CO, Aug. 14-17, 2000, XP002210575.

Stallings, W.: "S/MIME: E-Mail Gets Secure". Byte, McGraw-Hill Inc., St. Peterborough, US, vol. 23, No. 7, Jul. 1998, pp. 41-42, XP000774260.

Crocker S. et al.: "MIME Object Security Services; rfc1848.text". IETF Standard, Internet Engineering Task Force, IETF, CH, Oct. 1995, XP015007633.

Katsuro Inaya, et al., "Use Windows CE Now", ASCII, Oct. 1, 1999, vol. 23, No. 10, pp. 266-285.

Hiroyuki Sawano, Create a Secure Electronic Mail Environment with S/MIME!, @IT Security & Trust, May 30, 2001, URL: http://www.atmarkit.co.jp/fsecurity/special/04smime/smime01.html.

European Supplementary Search Report. Application No. 05826460.7, Feb. 14, 2008.

European Examination Report. Application No. 05826460.7, Apr. 4, 2008.

PCT International Search Report and Written Opinion of the International Searching Authority, International App. No. PCT/CA2005/D01956, Jul. 29, 2006.

Blom et al. "Conversational IP Multimedia Security", 4th International Workshop on Mobile and Wireless Communications Network, Sep. 9-11, 2002, pp. 147-151.

Fumy et al. Principles of Key Management, IEEE Journal on Selected Areas in Communications, VDI, 11, No. 5, Jun. 1999, pp. 785-793.

Eskicioglu et al. "A Key Transport Protocol Based on Secret Sharing Applications to Information Security", IEEE Transactions on Consumer Electronics, vol. 46, No. 4, Nov. 2002, pp. 816-824.

Notification of Grant, Chinese Application No. 02815759.1, dated Oct. 27, 2011.

Office Action from USPTO dated Dec. 1, 2011 for U.S. Appl. No. 12/916,929.

Office Action from USPTO dated Sep. 29, 2011 for U.S. Appl. No. 12/686,046.

Summons to Oral Proceedings in connection with Application No. 02744963.6-2201, dated Dec. 15, 2011.

EPO Communication Pursuant to Article 94(3) EPC, in connection with Application No. 09166522.4-2201, dated Feb. 8, 2012.

Certificate of Invention, Chinese Application No. 02815759.1, dated Jan. 25, 2012.

Office Action Response dated Dec. 22, 2011 for U.S. Appl. No. 12/686,046.

Office Action Response dated Mar. 12, 2012 for U.S. Appl. No. 12/691,204.

USPTO Office Action Response dated Feb. 24, 2012 for U.S. Appl. No. 12/916,929.

Applicant Interview Summary dated Mar. 15, 2012 for U.S. Appl. No. 12/686,046.

Notice of Allowance dated Mar. 20, 2012 for U.S. Appl. No. 12/686,046.

Response to Official Communication of Mar. 8, 2005, in connection with Application No. 02744963.6-2201, dated Sep. 16, 2005.

Response to Official Communication of Mar. 8, 2005, in connection with Application No. 02744963.6-2201, dated Oct. 31, 2005.

Response to Official Communication of Feb. 24, 2010, in connection with Application No. 02744963.6-2201, dated Sep. 6, 2010.

Response to Official Communication of Feb. 8, 2010, in connection with Application No. 09166522.4-2201, dated Sep. 17, 2010.

Notice of Allowance dated Apr. 12, 2012 for U.S. Appl. No. 12/691,204.

Amendment After Allowance dated Apr. 20, 2012 for U.S. Appl. No. 12/686,046.

Dusse et al., "S/MIME Version 2 Message Specification," Mar. 1998, pp. 1-37.

Dusse et al.: "S/MIME Version 2 Certificate Handling," Database IETF RFC Online IETF: RFC 2312, Mar. 1998, pp. 1-20 (Chapter 2.1, Chapter 4.1), XP002220385.

Encrypt Pre-shared Keys in Cisco IOS Router Configuration Example, Document 1D 46420 Cisco Systems, Internet Address: httollwww.cisco.com/en/US/tech/tk5S3/ tk3721technologies_configuration_example09186a00801f2336.shtml.

Hoffman: "Enhanced Services for S/M1ME," Database IETF RFC Online IETF;RFC 2634, Jun. 1999, pp. 1-58 (Chapter 3, pp. 24-32), XP002220386.

Kiely, Don, SQL Server 2005 Secures Your Data Like Never Before, Sep. 29, 2005. Internet Address: http:// www.devx.comIcodemaglArticle/29351?trk=DXESS_DB.

Kotzanikoloau et al. "Hybrid Key Establishment for Multiphase Self-Organized Sensor Networks", 6 IEEE International Symposium on a World of Wireless Mobile and Multimedia Networks, Jun. 13-16, 2005, pp. 581-587.

Notice of Allowance from USPTO dated Mar. 30, 2007 for U.S. Appl. No. 10/480,613.

Policht, Martin, SQL Server 2005 Security—Part 3 Encryption, Database Journal Internet Address: http// www.databasejournal.comffeatures/mssql/article.php/34S3931.

Research in Motion Limited, Blackberry Security White Paper Release 4.0 2005 Internet Address: http://blackberry.comIknowledgecenterpubliclivelink.exe?func=II&objld=S2S044&objAction=browse&sort=name.

Stale Schumacher: "AutoPGP FAQ, Version 1," Internet Newsgroup, 'Online (Apr. 19, 1994), XP002230742.

Wasley D.L. et al.: "Improving Digital Credential Management in Browsers" Internet Article. HEPKI-TAG Recommendation, 'Online! Jul. 21, 2000, XP02213004 Retrieved from the Internet: <URL:http://middleware.internet2.edu/hepk i-tag/HEPKI-TAG-Certs-Browser-03.pdf> 'retrieved on Sep. 10, 2002.

Zollner J: "Gateways to Overcome Incompatibilities of Security Mechanisms" Reliable Distributed Systems, 1999. Proceedings of the 19th IEEE Symposium on Lausanne, Switzerland Oct. 19-22, 1999, Los Alamitos, Cal., USA, IEEE Comput. Soc, US Oct. 19, 1999, pp. 372-377.

Office Action from USPTO dated May 15, 2007 for U.S. Appl. No. 10/480,514.

Response to Office Action from USPTO dated Nov. 14, 2007 for U.S. Appl. No. 10/480,514.

Office Action from USPTO dated Jan. 10, 2008 for U.S. Appl. No. 10/480,514.

Response to Office Action from USPTO dated May 12, 2008 for U.S. Appl. No. 10/480,514.

Office Action from USPTO dated Jul. 24, 2008 for U.S. Appl. No. 10/480,514.

Response and RCE to Office Action from USPTO dated Jan. 26, 2009 for U.S. Appl. No. 10/480,514.

Office Action from USPTO dated Mar. 4, 2009 for U.S. Appl. No. 10/480,514.

Response to Office Action from USPTO dated Jun. 24, 2009 for U.S. Appl. No. 10/480,514.

Notice of Allowance from USPTO dated Sep. 10, 2009 for U.S. Appl. No. 10/480,514.

Office Action from USPTO dated Feb. 3, 2009 for U.S. Appl. No. 11/089,869.

Response to Office Action from USPTO dated Jun. 4, 2009 for U.S. Appl. No. 11/089,869.

Office Action from USPTO dated Sep. 18, 2009 or U.S. Appl. No. 11/089,869.

Response to Office Action from USPTO dated Dec. 18, 2009 for U.S. Appl. No. 11/089,869.

Notice of Allowance from USPTO dated Mar. 17, 2010 for U.S. Appl. No. 11/089,869.

Request for Continued Examination (RCE) dated May 21, 2010 for U.S. Appl. No. 11/089,869.
Notice of Allowance from USPTO dated Jun. 28, 2010 for U.S. Appl. No. 11/089,869.
Office Action from CIPO, Canadian Application No. 2,450,631, dated Feb. 24, 2009.
Notice of Allowance, Canadian Application No. 2,450,631, dated Apr. 5, 2011.
EPO Communication Pursuant to Article 96(2) EPC, in connection with Application No. 02744963.6-2201 dated Mar. 8, 2005.
EPO Communication Pursuant to Article 94(3) EPC, in connection with Application No. 02744963.6-2201, dated Feb. 24, 2010.
First Office Action, Chinese Application No. 02815485.1, dated Jun. 19, 2009.
Notice of Allowance (Notification for the Grant of Invention), Chinese Application No. 02815485.1, dated Sep. 14, 2010.
Office Action, Korean Application No. 2003-7016343, dated Aug. 23, 2005.
Notice of Allowance (Decision for Patent), Final Office Action, Korean Application No. 2003-7016343, dated Feb. 23, 2006.
Certificate of Grant of Patent, Singapore Patent Application No. 200307398-8, dated Dec. 30, 2005.
Notification Prior to Examination, Israeli Application No. 159340, dated Jun. 24, 2007.
Office Action, Israeli Application No. 159340, dated Mar. 4, 2008.
Office Action, Israeli Application No. 159340, dated Sep. 1, 2009.
Office Action, Israeli Application No. 159340, dated Jul. 19, 2010.
Notice of Allowance, Israeli Application. 159340, dated Oct. 27, 2010.
First Examination Report, Indian Application No. 2176/DELNP/2003, dated May 6, 2004.
Intimation of Grant, Indian Application No. 2176/DELNP/2003, dated May 19, 2005.
Office Action for Japanese Application No. 2003-504619, dated Feb. 22, 2007 (mailed Feb. 26, 2007).
Office Action for Japanese Application No. 2003-504619, dated Mar. 18, 2008 (mailed Mar. 22, 2008).
Office Action for Japanese Application No. 2003-504619, dated Dec. 1, 2008 (mailed Dec 31, 2008).
Certificate of Patent, Japanese Application No. 2003-504619, issued Feb. 19, 2010.
Office Action from USPTO dated Oct. 4, 2006 for U.S. Appl. No. 10/480,613.
Notice of Allowance, Israeli Application. 159342, dated Feb. 14, 2008.
Office Action issued by the USPTO on Jun. 23, 2010 for U.S. Appl. No. 10/486,406.
Office Action issued by the USPTO on Aug. 11, 2010 for U.S. Appl. No. 12/480,841.
Written Submission in Preparation of Oral Proceedings, European Application No. 02744963.6, dated Mar. 6, 2012.
Notice of Non-Responsive Amendment dated May 16, 2012 for U.S. Appl. No. 12/916,929.
Response to Notice of Non-Responsive Amendment dated May 25, 2012 for U.S. Appl. No. 12/916,929.
Interview Summary, European Application No. 02744963.6, dated Apr. 18, 2012.
Provision of the Minutes and Minutes of the Oral Proceedings, European Application No. 02744963.6, dated May 25, 2012.
Decision to Refuse the Application, European Application No. 02744963.6, dated May 23, 2012.
Australian Examinees Report issued on Oct. 12, 2006 for Australian patent application No. 2005204223.
Berson T et al: "Cryptography as a network service" 8th Annual Symposium on Network and Distributed System Security. (NDSS' 01) Internet Soc Reston, VA, USA, Feb. 7, 2001, Feb. 9, 2001 pp. 1-12, XP002551706 .
Butrico M et al: "Enterprise data access from mobile computers: an end-to-end story" Research Issues in Data Engineering, 2000. Ride 2000. Proceedings. Tenth International Workshop on San Diego, CA, USA Feb. 28-29, 2000, Los Alamitos, CA, USA, IEEE Comput. Soc, US, Feb. 28, 2000, pp. 9-16, XP010377083.

Chadwick, D.W. et al. "Modifying LDAP to Support X.509-based PKIs", In Seventeenth Annual IFIP WG 11.3 Working Conference on Database and Applications Security at Estes Park, Colorado, Aug. 2003.
Chinese First Office Action (English translation). Application No. 200510095984.7. Dated: Nov. 21, 2008.
Deroest J.: "Ubiquitous Mobile Computing" Sunexpert Magazine, 'Online! Jul. 1998, pp. 54-56, SP002213003 Retreived from the Internet: <URL:http://swexpert.com/C8/SE.C8.Jul.98.pdf> 'retreived on Sep. 10, 2002!.
EPO Communication Pursuant to Article 96(2) EPC, issued by the European Patent Office on Dec. 6, 2006 in connection with application No. 04104240.9.
Hämetvaara, Vesa. "Modifying LDAP to Support X.509-based PKIs", In Seventeenth Annual IFIP WG 11.3 Working Conference on Database and Applications Security at Estes Park, Colorado, Aug. 2003.
Housley, R et al. "Internet X.509 Public Key Infrastructure Certificate and CRL Profile (RFC 2459)", Jan. 1999.
Indian Examination Letter. Application No. 2290/DEL/2005. Dated: Apr. 13, 2007.
Inquiry issued by the Japanese Patent Office on Mar. 13, 2009 for Japanese Patent Application No. 2003-504272.
ITU-T, "Information technology—Open systems interconnection—The Directory: Public-key and attribute certificate frameworks", Mar. 2000.
Jin Jing et al: "Client-server computing in mobile environments" ACM Computing Surveys, Jun. 1999, ACM, USA, vol. 31, No. 2, pp. 117-157, XP002212945.
Korean Decision for Final Rejection (English translation). Application No. 10-2005-0081103. Dated: Apr. 12, 2007.
Myers, M. et al. "Certificate Management Messages over CMS (RFC 2797)", Apr. 2000.
Myers, M. et al., X.509 Internet Public Key Infrastructure Online Certificate Status Protocol—OCSP, RFC2560 (Jun. 1999).
Nakajima T et al: "Adaptive continuous media applications in mobile computing environments" Multimedia Computing Systems '97. Proceedings., IEEE International Conference on Ottawa, Ont., Canada Jun. 3-6, 1997, Los Alamitos, CA, USA, IEEE Comput. Soc. US, Jun. 3, 1997, pp. 152-160, XP010239184.
Notice of Reason for Rejection issued by the Japanese Patent Office on Feb. 16, 2009 for Japanese Patent Application No. 2005-253511.
Notice of Reason for Rejection issued by the Japanese Patent Office on Jan. 5, 2010 for Japanese Patent Application No. 2005-253511.
Notice of Reason for Rejection issued by the Japanese Patent Office on May 12, 2006 for Japanese Patent Application No. 2003-504272.
Office Action issued by the USPTO on Apr. 15, 2009 for U.S. Appl. No. 11/259,372.
Office Action issued by the USPTO on Apr. 27, 2009 for U.S. Appl. No. 11/291,178.
Office Action issued by the USPTO on Jan. 13, 2009 for U.S. Appl. No. 10/914,634.
Office Action issued by the USPTO on Jul. 15, 2008 for U.S. Appl. No. 10/931,983.
Office Action issued by the USPTO on Nov. 13, 2007 for U.S. Appl. No. 10/931,983.
Office Action issued by the Canadian Intellectual Property Office on Jul. 13, 2009 for Canadian Patent Appl. No. 2,517,211.
Office Action issued by the USPTO on Oct. 29, 2009 for U.S. Appl. No. 11/259,372.
Ramsdell, D. et al. "Secure/Multipurpose Internet Mail Extensions (S/MIME) Version 3.1 Certificate Handling (RFC 3850)", Jul. 2004.
Research in Motion Limited, BlackBerry Security with the S/MIME Support Package, version 1.5, Dec. 17, 2003.
Russell S: "Fast checking of individual certificate revocation on small systems" Computer Security Applications Conference, 1999. (ACSAC '99). Proceedings. 15th Annual Phoenix, AZ, USA Dec. 6-10, 1999, Los Alamitos, CA, USA, IEEE Comput. Soc. US, Dec. 6, 1999, pp. 249-255, XP010368617.
Singapore Examination Report. Application No. 200505340-0. Dated: Sep. 19, 2006.
Wasley D.L. et al: "Improving Digital Credential Management in Browsers" Internet Article. HEPKI-TAG Recommendation, 'Online!

Jul. 21, 2000, XP002213004 Retrieved from the Internet: <URL:http://middleware.internet2.edu/hepk i -tag/HEPKI-TAG-Certs-Browser-03.pdf> 'retrieved on Sep. 10, 2002.

Written Opinion issued on Dec. 23, 2005 by the Australian Patent Office for Singapore patent application No. 200505624-7.

Zollner J: "Gateway to overcome incompatibilities of security mechanisms" Reliable Distributed Systems, 1999. Proceedings of the 19th IEEE Sympo Sium on Lausanne, Switzerland Oct. 19-22, 1999, Los Alamitos, Cal, USA, IEEE Comput. Soc, US Oct. 19, 1999, pp. 372-377, XP010357040 ISBN: 978-0-7695-0290-8.

Response in connection with European Patent Application No. 09166522.4-2201, dated Jun. 6, 2012.

Notice of Allowance from CIPO, Canadian Application No. 2,450,601 dated Jul. 9, 2012.

Amendment dated May 6, 2003, EP Application No. 02734959.

Amendment dated Jul. 24, 2003, EP Application No. 02734959.

Response Dec. 8, 2004, EP Application No. 02734959.

Written submission in preparation for oral proceedings dated Jun. 26, 2009, EP Application No. 02734959.

Response dated Jan. 31, 2006, EP Application No. 02734959.

RCE dated Jun. 29, 2012 for U.S. Appl. No. 12/691,204.

Notice of Allowance dated Aug. 17, 2012 for U.S. Appl. No. 12/691,204.

USPTO Final Office Action dated Aug. 23, 2012 for U.S. Appl. No. 12/916,929.

U.S. Response and RCE dated Nov. 22, 2012, U.S. Appl. No. 12/916,929.

EP Summons to Attend Oral Proceedings dated Dec. 4, 2012, EP Application No. 09166522.4-2201.

EP Response to Summons dated Feb. 5, 2013, EP Application No. 09166522.4-2201.

EP Result of Consultation dated Mar. 4, 2013, EP Application No. 09166522.4.

EP Decision to Refuse dated Apr. 3, 2013, EP Application No. 09166522.4.

EP Minutes of Oral Proceedings dated Apr. 3, 2013, EP Application No. 09166522.4.

\* cited by examiner

SYSTEM AND METHOD FOR PROCESSING ENCODED MESSAGES FOR EXCHANGE WITH A MOBILE DATA COMMUNICATION DEVICE

CROSS-REFERENCE TO RELATED APPLICATIONS

This application claims priority to U.S. Provisional Application No. 60/297,681 (entitled "An Advanced System and Method for Compressing Secure E-Mail for Exchange with a Mobile Data Communication Device" filed Jun. 12, 2001). This application is a continuation of U.S. patent application Ser. No. 10/480,514, filed on Dec. 11, 2003, which is a national stage entry of PCT/CA02/00890, filed on Jun. 12, 2002, which claims priority to U.S. Provisional Application No. 60/297,681, filed Jun. 12, 2001. The entirety of each of which is herein incorporated by reference.

BACKGROUND OF THE INVENTION

1. Field of the Invention

The present invention is directed to exchanging e-mail messages involving a mobile data communications device ("mobile device"), and more particularly to exchanging secure e-mail messages involving a mobile device.

2. Description of the Related Art

There are many solutions for exchanging information between host systems and mobile devices. These systems all follow simple encoding methods for delivering a shortened version of the original message to the wireless mobile device, keeping in mind the limited memory and display capabilities of the device. However, there is a lack of focus and attention being paid to the problem of delivering S/MIME message to mobile devices. Currently there are no known systems that try to delivery the entire S/MIME message to the mobile device. This is because the bandwidth and battery limitations when using wireless devices makes it impossible to create such a solution without performing any pre-processing on the message. One major problem is that S/MIME messages are too large to send effectively to the mobile device. If the entire S/MIME message is sent, it could use excessive amounts of memory and battery power just for a single message. Considering the time necessary for reception, the memory required for storage and the battery required to handle the RF exchange, a product that tried to support direct S/MIME would be unusable to the average business user. The second problem is that there are no public key servers accessible to wireless networks and wireless devices. As a result the use of public key crypto operations is very difficult and requires heavy caching operations to eliminate the Public Key Infrastructure (PKI) requirements.

In the area of exchanging secure e-mail there are additional problems that include (1) the inability for mobile devices to retrieve public encryption keys from Public Key Infrastructures (PKIs) to encrypt messages being sent from the mobile device, (2) the inability to retrieve public keys on received messages that are signed, (3) the inability to deal with very large Certificate Revocation Lists (CRLs) on small devices and (4) the time delay on mobile devices with slower CPUs to perform complex math calculations involved with public key encryption algorithms. These problems and others result in a poor and frustrating user experience when trying to exchange S/MIME-based e-mail messages with other companies.

Therefore there remains a need for a system and method for processing secure mail so that S/MIME messages can be exchanged with mobile devices. There also remains a method for leveraging the processor power of the host system to enable a better user experience when exchanging S/MIME messages with outside correspondents.

SUMMARY

In accordance with the teachings herein, a system and method are provided for processing secure mail so that S/MIME messages (or other types of secure messages) can be exchanged with mobile devices. The system and method may include different aspects, such as reducing the size of the S/MIME messages and/or pre-processing S/MIME messages to enable transmission of S/MIME with mobile devices.

For example, the system and method may provide for pre-processing encrypted and/or signed messages at a host system before the message is transmitted to a wireless mobile communication device. The message is received at the host system from a message sender. There is a determination as to whether any of the message receivers has a corresponding wireless mobile communication device. For each message receiver that has a corresponding wireless mobile communication device: the message is processed so as to modify the message with respect to one or more encryption and/or authentication aspects. The processed message is transmitted to a wireless mobile communication device that corresponds to the first message receiver. The system and method may also include post-processing messages sent from a wireless mobile communications device to a host system. Authentication and/or encryption message processing is performed upon the message. The processed message may then be sent through the host system to one or more receivers.

In other situations, the system and method may rearrange signed e-mail messages at a host system in order to reduced transmitted data being sent to a mobile device. The steps may include: (A) receiving a signed e-mail message at the host system from a message sender addressed to one or more message receivers; (B) confirming that at least one addressee has a corresponding mobile device; (C) rearranging the senders signature, Certificate and Certificate Revocation Lists within the message placing them at the end of the message; (D) sending the message, followed by the senders signature to the mobile device, and (E) holding back the Certificate and Certificate Revocation Lists so that the user has to request these items if they are not already on the mobile device.

Further in the area of size reduction, the system and method may rearrange encrypted e-mail messages at a host system so that the important information for the receiver is placed first. The steps may include: (A) receiving an encrypted e-mail message from a message sender addressed to one or more message receivers; (B) confirming that at least one addressee has a corresponding mobile device; (C) for each message receiver that has a corresponding mobile device, the system and method may (1) regenerate the message so that it contains only the message text and the session key for the address that matches a specific user's mobile device; and (2) transmit the message and selected session key without sending the other session keys contained within the original message.

In the area of pre-processing it is possible for the host system to preauthorize a signed message and send the mobile device the result of the pre-processing. The steps for this method may include: (A) receiving a signed e-mail message at the host system from a message sender addressed to one or more message receivers; (B) confirming that at least one addressee has a corresponding mobile device; (C) extracting the signature, certificates and certificate revocation lists following normal S/MIME practice; (D) performing a signature preauthorization on the message using the necessary public key information and following normal S/MIME practice on behalf of the mobile device user; and (E) transmitting to the user the original message with a flag indicating whether the message had been signed and whether the signature was verified. This flag will be signed by the sender so the device can verify the flag is valid.

Further in the area of pre-processing it is possible for the host to decrypt e-mail data from standard S/MIME on behalf of the mobile device user. The steps for this method may include: (A) receiving an encrypted e-mail message from a message sender addressed to one or more message receivers; (B) confirming that at least one addressee has a corresponding mobile device; (C) for each message receiver that has a corresponding mobile device the system and method may (1) identify the individual session key that matches an e-mail address for a corresponding mobile device; (2) generate a intermediary message for the mobile device user with just the encrypted session key for the corresponding user, (3) send the encrypted session key to the mobile device user, (4) decrypt the session key at the mobile device, (5) return the decrypted session key to the host system; (6) decrypt the original message contents using the returned session key, and (7) send the decrypted message to the mobile device user.

These are just a few of the many advantages of the system and method, as described in more detail below. As will be appreciated, other and different embodiments than those expressly described are possible, and their several details are capable of modifications in various respects. Accordingly, the drawings, and description of the system and method set forth below are to be regarded as illustrative in nature and not restrictive.

DETAILED DESCRIPTION

Figure 1:
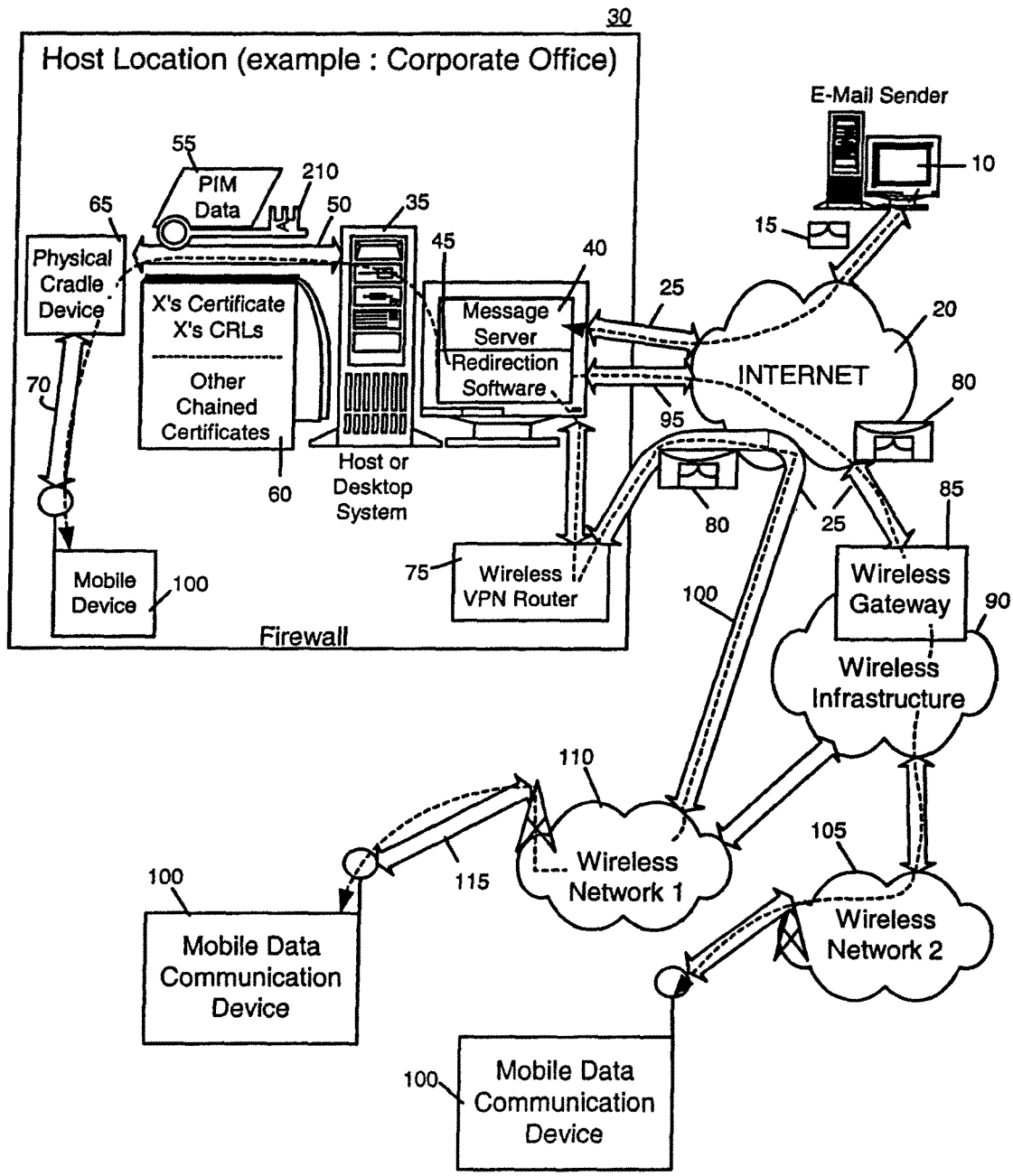
FIG. 1 is an overview of an environment in which a wireless data communication device may be used, showing network elements in the system.

With reference to FIG. 1, this illustration represents a complex overview of a sample network topology. Naturally, one skilled in the art can appreciate there could be hundreds of different topologies, but the one selected helps demonstrate how the system and method works. There could be many e-mail senders in the Internet and many Internal company-based senders of e-mail. The system and method discussed herein use the example of mail being exchange between companies, or branch offices across an 'insecure' network like the Internet. It should be understood that this is only an exemplary environment as the system and method may be utilized outside of company settings, such as in individual secure e-mail exchanges.

Most mail exchanges today between companies remains unencrypted and unsigned so that anyone on the Internet; with some amount of effort, could see the information being exchanged. To address this issue, new standards like PGP™ (Pretty Good Privacy) and S/MIME (Secure Multipurpose Internet Mail Extensions) are being used to exchange mail between companies. FIG. 1 illustrates an example of an Internet e-mail environment where security between companies is not used.

Turning now to FIG. 1, there is shown a central host location, typically referred to herein as a corporate office or Host Location 30. However, this does not restrict the host location from being a branch office, a home office or some other secure location where mail messages are being exchanged. Also shown is an e-mail sender 10, which could be an individual using an ISP (Internet Service Provider) account, a person within another company, a person in the same company within another branch office, or it could be a user of a large ASP (application service provider) like an America Online (AOL) user. Within the corporate office 30 is a message server 40, running on some computer within the firewall of the corporation, that acts as the main interface for the corporation to exchange mail with the Internet 20. Two common message servers 40 are Microsoft™ Exchange and Lotus Domino™. These products are often used in conjunction with Internet mail routers that typically use UNIX-based Sendmail protocols to route and deliver mail. These message server 40 products do extend beyond just e-mail sending and receiving, they also include dynamic database storage engines that have pre-defined database formats for data like Calendars, todo lists, task lists, e-mail and documentation.

Within this typical corporate environment, a redirection software program 45 is inserted. Although the redirection software 45 is shown to reside on the same machine, for ease of presentation, there is no requirement that it must reside here. The redirection software 45 and the message server 40 products are designed to co-operate and interact to allow the pushing of information to mobile devices 100. In this installation, the redirection software 45 is taking confidential and non-confidential corporate information for a specific user and redirecting it out through the corporate firewall to mobile devices 100. A more detailed description of an example of the redirection software 45 may be found in PCT International application Ser. No. 09/087,632, U.S. Pat. No. 6,219,694, and U.S. patent application Ser. No. 09/401,868, Ser. No. 09/545, 963, Ser. No. 09/528,495, Ser. No. 09/545,962, and Ser. No. 09/649,755, all of which are hereby incorporated into the present application by reference. The push techniques described in these applications and patent use a wireless friendly encoding, compression and encryption technique to deliver all information to the mobile device, thus extending the company firewall to include the mobile device 100.

It is noted that the host system at the host location 30 may be message server 40 running within a corporate environment behind a company firewall. The message server 40 has an associated wireless enabling component known as the redirection software 45. A redirection software 45 may be used (either directly on the host system or on a different computer platform) to redirect information to a wireless data communication device. Alternatively, the host system could be a user's desktop PC, also running within a corporate environment connected to local-area network ("LAN"), or could be any other system that is in communication with the user's desktop PC.

A redirection program or software 45 operating at the host system, normally in association with a message server 40, enables the user to redirect or mirror certain user-selected data items (or parts of data items) from the host system to the user's mobile data communication device upon detecting that one or more user-defined triggering events has occurred. In the process of redirecting data items to the user's mobile data communication device there is special processing performed that enables the support of S/MIME or PGP messages. For one skilled in the art of S/MIME, it is well known that the original message size of an e-mail message can be dramatically increased when S/MIME algorithms are applied to the mail message. By applying advanced filtering, re-organization and pre-processing on the message the user can still receive such data items at a mobile device. In some situations, the user can still have full control over the S/MIME processing stage and can direct the host system as to the procedures it performs.

Operating at the host system are various sub-systems that can be configured to create triggering events, such as a screen saver sub-system or a keyboard sub-system, as well as sub-systems for repackaging the user's data items for transparent delivery to the mobile data device, such as a TCP/IP sub-system or one or more e-mail sub-systems. Other sub-systems within the redirection software 45 include components for dealing with signed e-mail, interacting with Public Key Infrastructures (PKIs), and repackaging of the user's encrypted data items. The host system also includes a primary memory store where the user's data items are normally stored with related information as to which folder the message might have originally been placed into.

Using the redirector software 45, a user can select certain data items for redirection, such as e-mail messages, calendar events, meeting notifications, address entries, journal entries, personal reminders, etc. The user can also select folders for redirection to or mirroring on the mobile device. For example the user may select that only data items in the Inbox and those in the company X folder shall be sent to the device. Having selected the data items for redirection, the user can then configure one or more event triggers to be sensed by the redirection software 45 to initiate redirection of the user data items. These user-defined trigger points (or event triggers) include external events, internal events and networked events.

Examples of external events include receiving a message from the user's mobile data communication device to begin redirection, receiving a similar message from some external computer, sensing that the user is no longer in the vicinity of the host system, or any other event that is external to the host system. Internal events could be a calendar alarm, screen saver activation, keyboard timeout, programmable timer, or any other user-defined event that is internal to the host system. Networked events are user-defined messages that are transmitted to the host system from another computer coupled to the host system via a network to initiate redirection. These are just some of the examples of the types of user-defined events that can trigger the redirector program to push data items from the host to the mobile device.

Once an event has triggered redirection of the user data items, the host system then repackages these items in a manner that is transparent to the mobile data communication device, so that information on the mobile device appears similar to information on the user's host system. In addition to repackaging the information itself, the repackaging may also include properties about the message, for example whether the message was signed and whether the signature was verified. The repackaging method may include wrapping the user data items in an e-mail envelope that corresponds to the address of the mobile data communication device, although, alternatively, other repackaging methods could be used with the system and method disclosed herein, such as special-purpose TCP/IP wrapping techniques, or other methods of wrapping the user selected data items. The repackaging preferably results in e-mail messages appearing to come from the host system even though they are initiated at the mobile device, thus enabling the user to appear to have a single e-mail address, such that the recipients of messages sent from the mobile communications device do not know where the user was physically located when the message was first sent. The repackaging also permits both messages to the mobile device and sent from the mobile device to be encrypted and decrypted as well as compressed and decompressed. To maintain this appearance of transparency the support of S/MIME security is essential. Effectively the goal is to extend the S/MIME security from company to company and then onto the mobile device.

In an alternative system and method, the redirection software executes on a network server, and the server is programmed to detect numerous redirection event triggers over the network from multiple user desktop computers coupled to the server via a LAN. The server can receive internal event triggers from each of the user desktops via the network, and can also receive external event triggers, such as messages from the users' mobile data communication devices. In response to receiving one of these triggers, the server redirects the user's data items to the proper mobile data communication device. The user data items and addressing information for a particular mobile device can be stored at the server or at the user's PC. Using this alternative configuration, one redirection software can serve a plurality of users. This alternative configuration could also include Internet- or intranet-based redirection software that could be accessible through a secure web page or other user interface. The redirection software could be located on an Internet Service Provider's system and accessible only through the Internet.

In another alternative configuration, redirection software operates at both the host system and at the user's mobile data communication device. In this configuration, the user's mobile device operates similarly to the host system described below, and is configured in a similar fashion to push certain user-selected data items from the mobile device to the user's host system (or some other computer) upon detecting an event trigger at the mobile device. This configuration provides two-way pushing of information from the host to the mobile device and from the mobile device to the host.

As shown in FIG. 1, there are many alternative paths for getting information to the mobile device 100. A method for getting information to the mobile device 100, discussed later in this section, is through the serial port 50, using a serial cradle 65. This method tends to be used for bulk information updates often performed at initialization of the system. The other main method for data exchange is over-the-air using Radio Frequency (RF) networks to delivery the information. As shown in FIG. 1, this could be accomplished through a Wireless VPN router 75, assuming this is available to the company, or through a traditional Internet connection 95 to a Wireless Gateway 85 and a Wireless Infrastructure 90. The concept of a Wireless VPN router 75 implies that a Virtual Private Network (VPN) connection could be established directly through a specific wireless network 110 to the mobile device 100. The Wireless VPN router 75 may be used, for example, when the new Internet Protocol (IP) Version 6 (IPV6) is available in IP-based wireless networks. This new protocol will provide enough IP addresses to dedicate an IP address to every mobile device 100 and thus make it possible to push information to the mobile device 100 at any time. One advantage of using this Wireless VPN router 75 is that it could be an off-the-shelf VPN component which would not require a separate Wireless Gateway 85 and Wireless Infrastructure 90. A VPN connection would most likely use a Transmission Control Protocol over IP (TCP/IP) or User Datagram Protocol over IP (UDP/IP) connection to deliver the messages directly to the mobile device 100.

If a Wireless VPN router 75 is not available, then link 95 to the Internet is the most common connection mechanism available. To handle the addressing of the mobile device 100, a wireless gateway 85 is typically used. Then to abstract a connection to multiple wireless networks 110 and 105, a wireless infrastructure 90 can be employed. One function of the wireless infrastructure 90 is to determine the most likely network for locating a given user and track the user as they roam between countries or networks. The messaging being delivered to the mobile devices 100 are normally sent via RF transmission 115 from a base station to the mobile device 100.

Also shown in FIG. 1 is a composed e-mail message 15 leaving the e-mail sender 10, located somewhere on the Internet 20. This message 15 is fully in the clear and uses traditional SMTP, RFC822 headers and MIME body parts to define the format of the mail message. These techniques are all well known to one in the art. In this environment, the message 15 arrives at the message server 40 and is redirected by the redirection software 45 to the mobile device 100. As this redirection takes place, the message is re-packaged into an electronic envelope 80 and a proprietary compression and encryption algorithm can be applied to the original message 15. In this way, messages being read on the mobile device 100 are no less secure then reading them on the desktop workstation 35. All messages exchanged between the redirection software 45 and the mobile device 100 use this message repackaging technique. Another goal of this outer envelope is to maintain the addressing information of the original message. This allows reply messages to reach the appropriate destination, and it allows the "from" field to reflect the mobile user's desktop or message server account address. Using the user's corporate address from the mobile device 100 allows the received message to appear as though the message originated from the user's desktop system 35 rather than the mobile device 100.

Turning back to the serial port connectivity 50 to the mobile device 100, this connection path offers many advantages for enabling one-time data exchange of large items. For those skilled in the art of PDAs and synchronization the most common data exchanged over this link is Personal Information Management (PIM) data 55. When exchanged for the first time, this data tends to be large in quantity, bulky in nature and requires a large bandwidth to be loaded onto the mobile device 100. This serial link 50 is also used for other purposes, including transferring a private security key 210, a Certificate (Cert) of the User, Certificate Revocation Lists (CRLs), and chained Certs 60. The private key allows the desktop 35 and mobile device 100 share at least one personality and one method for accessing all mail. The Cert and CRLs are normally exchanged because they represent a large part of the information required to implement S/MIME, PGP and other public key security methods. A Cert chain includes an individual's Cert, as well as other Certs to verify the original Cert. Each Cert in a Cert chain is signed by a Cert issuer, whose Cert normally appears next in the Cert chain. A message receiver typically traces a certification path by verifying each Cert in a Cert chain until eventually, the message receiver is able to verify a common Cert, trusted by both the message sender and the receiver. Once a common Cert is found, a signature can be verified and trusted. The idea of using the serial port for loading Certs and CRLs will be discussed later herein. The goal of this download of Certs and CRLs is to allow the user to hand pick who they might be exchanging secure mail with, and to pre-load the bulky information onto the handheld device a head of time, thus saving wireless bandwidth later.

Turning back to the wireless infrastructure 90, there is a series of connections to wireless networks 110 and 105. These connections could be ISDN, Frame Relay or T1 connections using the TCP/IP protocol used throughout the Internet. These networks could represent distinct, unique and unrelated networks, or they could represent the same network in different countries. For example, the networks 110 and 105 may include such different types of network as (1) data-centric wireless networks, (2) voice-centric wireless networks and (3) dual-mode networks that can support both voice and data communications over the same physical base stations. Modern examples of these combined networks include, but are not limited to, (1) newer Code Division Multiple Access (CDMA) networks, (2) the Groupe Special Mobile or the Global System for Mobile Communications (GSM) and the General Packet Radio Service (GPRS) networks, and (3) third-generation (3G) networks like Enhanced Data-rates for Global Evolution (EDGE) and Universal Mobile Telecommunications Systems (UMTS), currently under development. GPRS is a data overlay on top of the very popular GSM wireless network. Data-centric network include, for example: (1) the Mobitex™ Radio Network ("Mobitex"), and (2) the DataTAC™ Radio Network ("DataTAC"). Examples of older voice-centric data networks include Personal Communication Systems (PCS) networks like CDMA, GSM, and Time Division Multiple Access (TDMA) systems.

Figure 2:
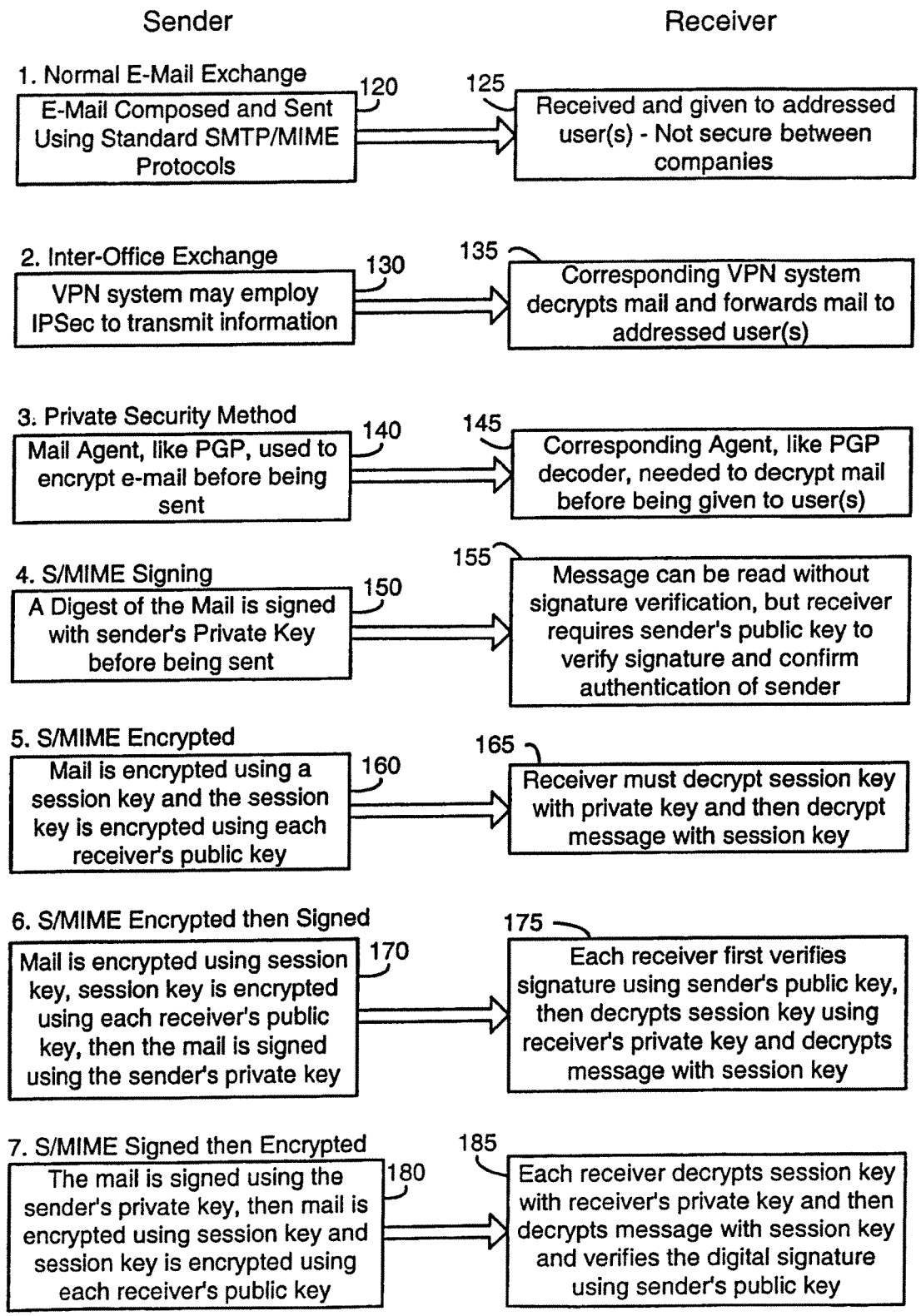
FIG. 2 is an illustration of the main types of e-mail exchanges that are commonly used today in the Internet.

Turning now to FIG. 2, which is an illustration of the main types of e-mail exchanges that are commonly used today in the Internet, we first have a normal exchange of e-mail messages (method 1). In this scenario, an e-mail is constructed using RFC822, RFC821 and MIME techniques and delivered using standard SMTP mail exchange protocols, as shown at 120. The e-mail is then received and given to the addressed users, as indicated at 125. Such normal e-mail exchange is typically secure within a company or LAN such as 30 (FIG. 1) located behind a security firewall, but not between standalone users and/or users on different networks.

Also commonly used are VPN links for inter-office message exchange (method 2), for example between branch offices of the same company, and sometimes between different companies that are working very closely together. Using this method, a lower-level security called IP Security (IPSec) may be used to encrypt all data being exchanged between the two VPN locations, as shown at 130. When an encrypted e-mail is received at a corresponding VPN system, it is decrypted into plain text and routed to addressed users, at 135.

E-mail exchange between different companies or users that have adopted a private security scheme is illustrated in FIG. 2 as method 3. In this scenario, a protocol such as PGP, Open-PGP or some other less widely used protocol is used to encrypt an e-mail before it is sent, at 140. Once received, a corresponding mail agent decrypts the e-mail and presents the plain text of the e-mail to the recipient, at 145.

Methods 4, 5, 6 and 7 shown in FIG. 2 relate to S/MIME. The methods are all different variations of S/MIME. In method 4, a sender takes a digest of an e-mail message and signs the digest using the sender's private key, as shown at 150. A digest may for example be generated by performing a check-sum, Cyclic Redundancy Check (CRC) or some other preferably non-reversible operation such as a hash on the message, and is then signed by the sender using the sender's private key. The signed digest is appended to the outgoing message, possibly along with the Cert of the sender, and possibly any chained Certs and CRLs. The receiver of such a signed message also takes a digest of the message, compares this digest with the digest appended to the message, retrieves the sender's public key, usually by extracting the public key from the sender's Cert, and verifies the signature on the appended digest. These operations are part of the signature verification indicated at 155 in FIG. 2. If the message content has been changed since it was signed by the sender, then the digests will be different or the signature on the digest will not verify properly. This does not prevent anyone from seeing the contents of the message, but does ensure the message has not been tampered with since it was signed by the sender, and that the message was signed by the person as indicated on the 'From' field of the message. The Cert, Cert chain and CRLs are used by a receiver to ensure that the sender's Cert is valid, i.e. that the Cert has not been revoked or expired, and trusted. The combination of a digest generated at a sender with the signature on the digest is typically referred to as a digital signature. Hereinafter, references to digital signatures should therefore be interpreted as including a digest and a signature of the digest.

Method 5 represents exchange of S/MIME encrypted messages. In this method, a one-time session key is generated, used to encrypt the body of a message, typically with a symmetric cipher like Triple Data Encryption Standard (3DES). The session key is then encrypted using the public key of each intended receiver of the message, at 160. Session key encryption is often accomplished using a public key encryption algorithm such as Rivest Shamir Adelman (RSA). The S/MIME message, including the encrypted message and all encrypted versions of the session key, is sent to each receiver. Each receiver must then locate its corresponding encrypted session key, normally based on a RecipientInfo summary of the receivers that is attached to the message, and decrypt that particular encoded session key using its private key, as indicated at 165. Once the session key is decrypted, it is used to decrypt the message body. An S/MIME message may also specify an encryption algorithm that must be used to decrypt the message. This information is normally placed in a header of an S/MIME message.

Exchange of messages that have been encrypted and then signed is shown in FIG. 2 as method 6. According to this scheme, the sender first generates a one-time session key, encrypts the message body and then encrypts the session key with the public key of each receiver, as described above. The sender then takes a digest of the message, including the encrypted session keys, and signs the digest using its private key to generate a digital signature, at 170. Each receiver takes a digest of the message, compares this digest with the digest in the digital signature appended to the message, retrieves the sender's public key, and verifies the signature on the digest, as described above. The correct session key is then located and decrypted with the receiver's private key, which then allows the message body to be decrypted. Signature verification and message decryption according to this method are shown in FIG. 2 at 175.

Method 7 in FIG. 2 illustrates exchanging messages that have been signed and then encrypted. A digital signature is generated by a sender substantially as described above, at 180. This digital signature, as well as possibly the sender's Cert, Cert chain and CRLs are all appended to the outgoing message. A session key is then generated and is used to encrypt the message body, digital signature, and any Certs and CRLs. The session key is encrypted with the public key of each receiver. The resultant S/MIME message, including the encrypted versions of the session key, is transmitted to the receiver. When a receiver receives such a message, as shown at 185, it must first decrypt its corresponding encrypted session key with its private key. The decrypted session key is then used to decrypt the message body, digital signature, and any Certs and CRLs of the message sender. The digital signature can then be verified as described above.

Figure 3:
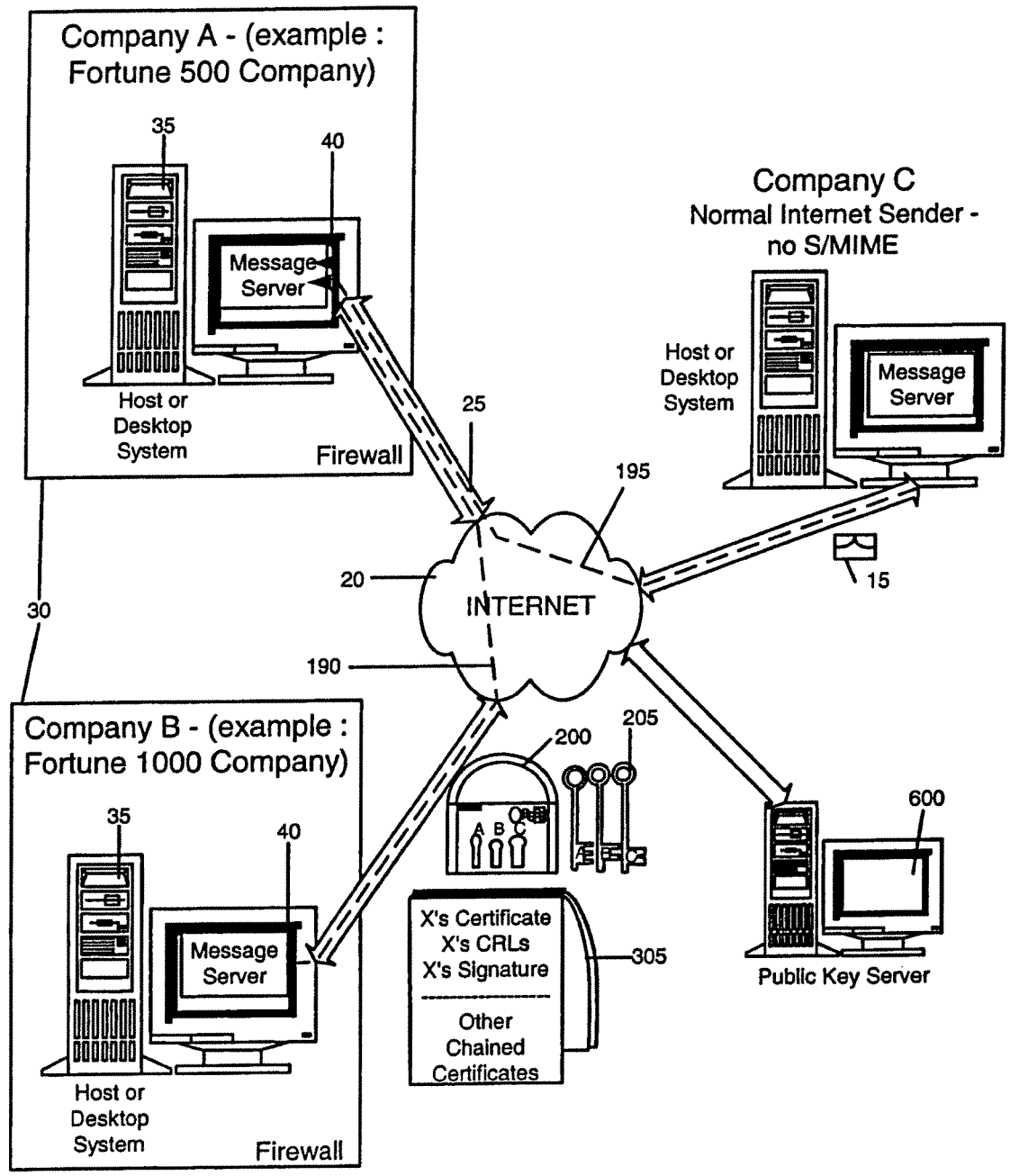
FIG. 3 is an illustration of the main system components involved with secure and unsecured e-mail exchanges.

In reference now to FIG. 3, this illustration shows a company that does not use encryption and another company that does use encryption and the effects on a message. In FIG. 3, Company C sends an e-mail message 15 to Company A. Company A, as shown, is a larger fortune 500 company for example, with a firewall and strong security practices. The message 15 traverses the Internet 195 and is received by the message server 40 in Company A's LAN environment. All these companies are connected to the Internet using a traditional T1, ISDN or Frame Relay type connection 25.

Company B is also a larger company, for instance a fortune 1000 company, that makes use of secure e-mail communications. People sending e-mail from Company B to Company A know that they can use S/MIME to secure the e-mail as both companies use the same standard. Also shown is a Public Key Server (PKS) 600 that supports the use of S/MIME. The PKS could reside within Company A's or Company B's firewall, or anywhere on the Internet 195. The sender of e-mail from Company B selects an encoding method, in this case signed and encrypted, and sends the e-mail message. Software within Company B's message server will take a digest of the message and sign the digest to generate a digital signature, and include the digital signature, as well as the sender's Cert and CRLs from their system. A session key will also be generated and used to encrypt the message. Public keys for each receiver will the be retrieved, from the PKS 600 if necessary, and encrypt the session key for each receiver. The resulting message has an encrypted component 200, the session keys 205 that are uniquely encrypted for each receiver (as shown by the different key formats and numbers A, B and C) and a signed component 305.

As will be apparent to those skilled in the art, the order of the signing and encryption operations and the message components that are signed and encrypted will depend on the variant of S/MIME used by a message sender. For example, if a message is to signed and then encrypted, the message digest is generated based on a body of a message, the digital signature and any signature-related information such as Certs and CRLs are added to the message, and then the entire message, including the message body, digital signature and any signature-related information, are encrypted using the session key. The session key is then encrypted for each receiver and encrypted versions of the session key are appended to the encrypted portion of the message. On the other hand, a message may be encrypted first, and then the digital signature is generated based on the encrypted message body and the encrypted session keys.

These first three diagrams represent an overview of the system and how encrypted mail works today on the Internet. The next three diagrams will illustrate several examples of the method to process secure e-mail messages. This first method represents a method for re-organizing the message to reduce the amount of data that must be transmitted to the device. This method performs the least amount of invasive procedures on the message before it is transmitted from the host to the mobile device. As such, this also means it offers the best security from the original sender to the final destination user. Naturally, this assumes the office environment is safe and that an intruder could not gain access to a company computer and read secure mail within the firewall.

Figure 4:
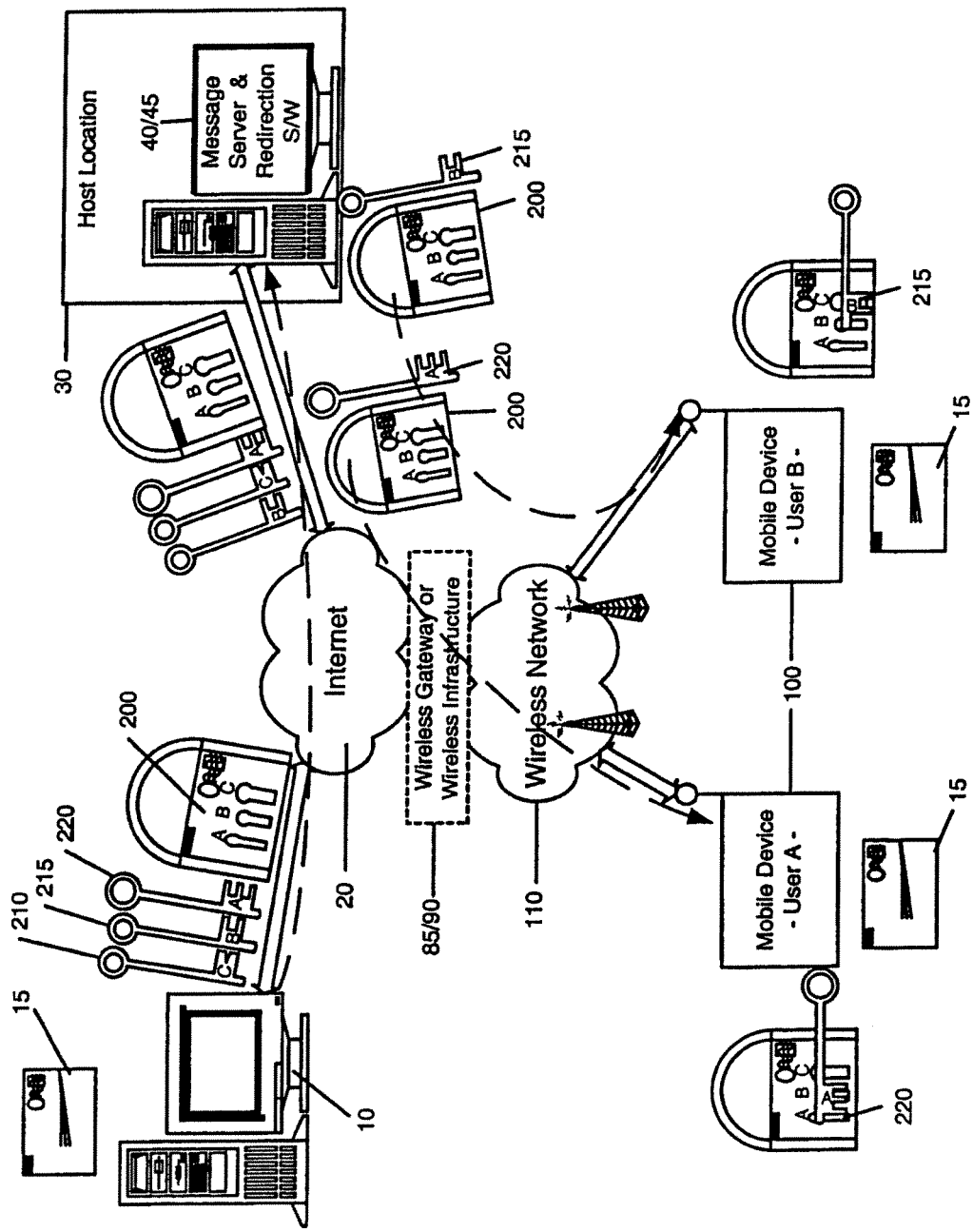
FIG. 4 is an illustration of how the system and method can re-arrange messages being sent using S/MIME or any public-key encryption methods.

In reference to FIG. 4, there is an example of how to improve processing on encrypted messages going to handheld devices. This is one of two methods that will be presented to improve the processing and transmission of public-key encrypted messages. This method has the advantage of using the same message encryption all the way from the message sender 10 to the mobile device 100. This could be important if there is no current encrypting being used between the redirection software 45 and the mobile device 100.

In FIG. 4, a message sender 10 composes an e-mail 15. In this example, the e-mail is being encrypted and is addressed to three recipients, A, B and C. The e-mail sender 10 encodes the e-mail 15 to produce a secure e-mail message 200. The e-mail 15 is encrypted by randomly generating a session key and the session key is further encrypted using public key of each intended recipient of the e-mail, which for this example produces three session keys 210, 215, 220. The public key for each receiver could have been retrieved from a local storage area, where the sender 10 has previously exchanged messages with one of the receivers for example, or a PKS. In this example, the PKS is not shown and the location of the keys for this example is not important, only that they do exist and are accessible.

The encrypted message and the session keys are passed through the insecure Internet 20 to the destination host location 30. A computer at the host system connected to the Internet 20 then receives the message, which is then given to the message server 40 for processing. Also working in cooperation with the message server 40 is the redirection software 45 that detects the encrypted message. To assist in the delivery of this message to the mobile device 100, the redirection software 45 re-arranges the message and removes any session keys that are not needed for the individual user's mobile device 100. Another part of the encrypted message is the RecipientInfo list, which provides a map as to which session key corresponds to which recipient in the To, Cc or Bcc list. The RecipientInfo list is also removed since the mobile device 100 will not need to parse through all the attached session keys once the redirector software 45 removes all of the encrypted session keys for other recipients of the message. In the cases where there could be 50 or 100 individual recipients, this could be a large overall message size savings.

In the example shown in FIG. 3, users A and B have user accounts associated with the message server 40. The redirection software 45 sends the re-organized message 200, with only the session key 220 specifically directed to user A. As those skilled in the art will appreciate, user A owns the private key that can decrypt the encrypted session key A. Similarly, the redirection software 45 re-organizes another transmission of message 200 with session key B 215. In this case, user B is the only user that can use session key B, since only user B's private key can decrypt encrypted session key B. At the mobile devices 100, both user A and user B open the message and extract the encrypted session key. The encrypted session key is then decrypted using the private key resident on each mobile device, and the decrypted session key is used to decrypt the user's message. By re-organizing the original message, the redirection software 45 was able to remove all unnecessary session keys and the RecipientInfo list from the original message. As the number of recipients increases, the overall message size benefit is greater, and the amount of data transmitted to the mobile device 100 is reduced.

Figure 5:
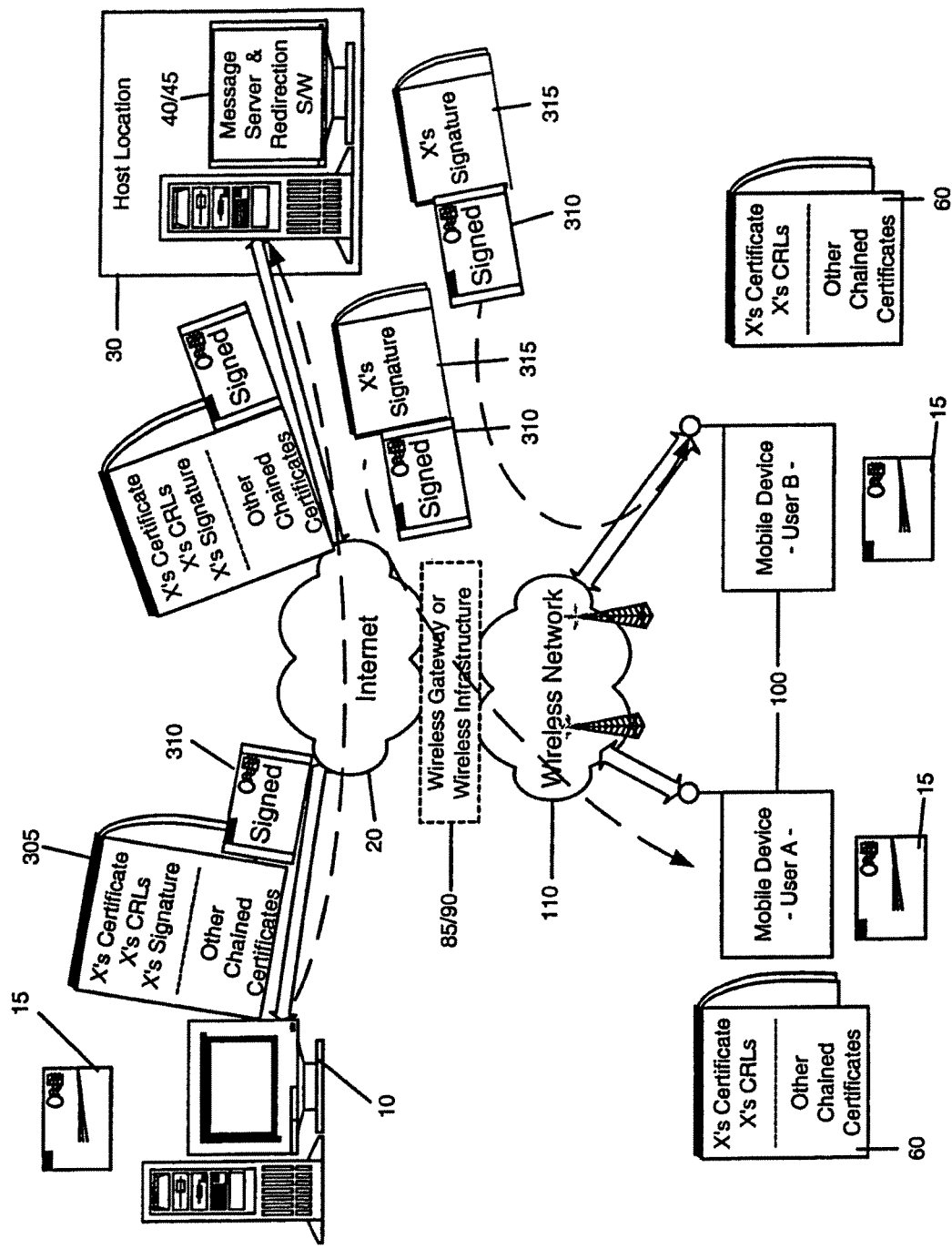
FIG. 5 is an illustration of how the system and method can reduce the size of messages being sent using S/MIME signing techniques.

In reference now to FIG. 5, an example of signed message processing before sending it from a host system to a mobile device is shown. In this example, the user sending the message decides to sign the message to confirm that they are the authentic sender of the message. The receiving host system removes part of the signature component (the Certificates and CRLs) and sends that to the mobile device. The mobile device must have preloaded the removed portions of the signature, or it must request them from the host, in order to verify the digital signature.

At the sender system 10, user X enters an e-mail message 15. In this example, the user X generates a digest of the message and signs the digest using their own private key. A digest is preferably a non-reversible transformation that generates a unique output for every unique input, such as a CRC of the message or a transformation using a digest algorithm such as MD5, ensuring that no part of the message can be changed without affecting the digest. The digest is then itself transformed using the private key of the sender, by encryption or some other processing, to generate a digest signature. The digest and digest signature are commonly referred, to as a digital signature.

To assist in verifying user X's digital signature, user X's Cert and a current CRL 305 are also sent with the message. A Public Key Authority (PICA) or Certificate Authority (CA) normally holds Certs for a plurality of users. The PKA might link several Certs together in a Cert chain to confirm the authenticity of user X's Cert 305. Effectively, each Cert contains a cryptographic link back to other Certs that create a chain of authorization. The CRL contains a list of Certs that should be considered invalid. For host systems that have kept old Certs, this is a method for removing their rights in the system. The message 310 is then sent with the Cert information 305 to the destination host location 30 associated with at least one of the intended recipients of the message 15.

Once received by a computer at the host location 30, the message is processed by the message server 40 and routed to each recipients e-mail account on the message server 40. At this point, the redirection software 45 detects the message and re-organizes the message before transmission to the mobile device 100. The main operation is to place the text of the message first, followed by the senders signature (X's Signature) and place the Cert Chain and the CRL last. This re-organized message 310 and possibly the signature 315 is transmitted to each of the recipients that has a mobile devices 100. The signature 315 is a truncated or re-organized form of the original signature, Cert and CRL components 305. In the first transmission, the Certificates and CRLs are stored at the host location 30 and not sent to the mobile device 100. At the mobile devices 100, the users opens the message and select a 'Verify Signature' or like menu option or operation for the message. The signature verification uses a local copy of the Cert and CRLs 60, which may have been downloaded earlier through the serial port 50 or received with an earlier message. If the message comes from a user whose Cert and CRL information was not previously loaded onto a mobile devices 100, a user can request that the redirection software 45 send the rest of the message. The second part of the message will contain the Cert and CRL for this sender and will allow the signature to be fully verified.

Figure 6:
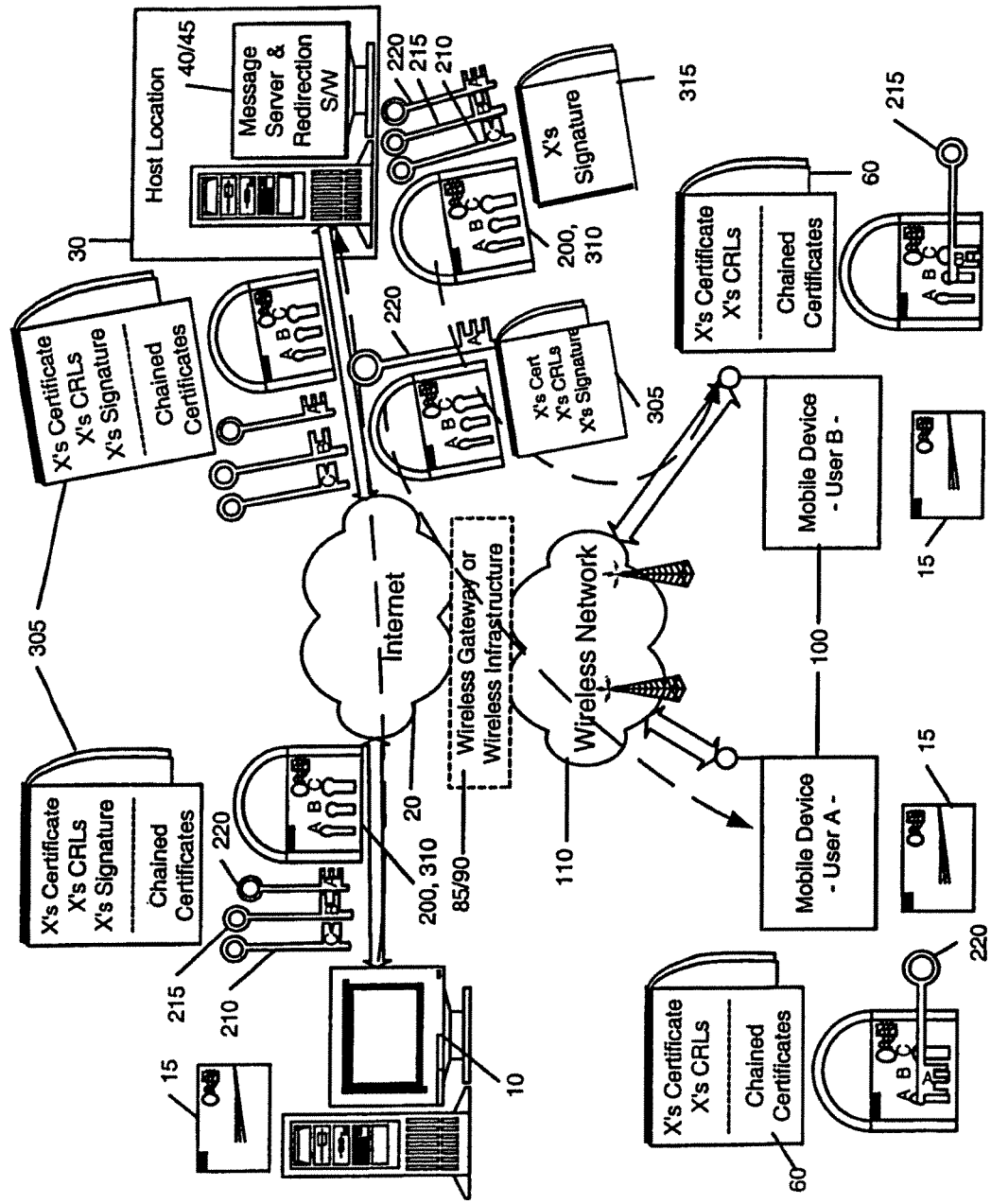
FIG. 6 is an illustration of how the system and method would reduce data size for messages that were both encrypted and signed using S/MIME or similar techniques.

In reference now to FIG. 6, there is an illustration of a message being sent that is both signed and encrypted. For FIG. 6, the impact of performing either operation first will be discussed. That means when the message is encrypted first and signed second there are one set of re-organizing methods that can be applied. When the message is signed first and encrypted second a second set of re-organizing techniques can be applied. When the message is encrypted first and signed second only the signature portion can be re-organized and modified. However, if the message was signed first and encrypted second then only the encrypted portion can be optimized. The steps in FIG. 6 are mostly a combination of the operations shown in FIGS. 4 and 5 and described above.

User X at system 10 creates a mail message 15 and decides to encrypt and then sign the message. To achieve this encoding, the system 10 first creates a session key and encrypts the message. Then the public key for each recipient is retrieved from either local storage or a PKS. For each message recipient, the session key is encrypted and attached to the message along with the RecipientInfo section. Once the encryption operations are complete, a digest of the new message, including the encrypted session keys, is taken, and this digest is signed using the senders private key to generate a digital signature. In the case where the message is signed first, a digest of the message would be taken first, without the encrypted session keys, and signed using the sender's private key. This digital signature and all the signed components, as well as any Certs and CRLs, would be encrypted using a session key and the session key would be encrypted using each recipients public key.

The encrypted and signed message 200, 310, with the session keys 205 and Cert information 305 is sent to another host location 30, where it is received by a message server 40 running on a computer system: As the message server 40 processes the message and places it into the appropriate user's mailbox the redirector software 45 detects the new message and begins the redirection process to each recipient that has a mobile device 100. Before the message is sent to a mobile device 100, the signature or encryption section of the message is re-organized and only the necessary portion is sent as described in conjunction with FIGS. 4 and 5. If the message has been encrypted first and signed second then only the sender's digital signature is included, and all other parts (Certs and CRLs) are placed at the end of the message. If the message was signed first and encrypted second, then the extra session keys are removed and only the session key for the designated user of the mobile device is sent. Once these re-organization steps are performed the resulting message 200, 310 is sent to each mobile user. The message to mobile device of user A is an example of a message that has been signed first and encrypted second. In this case the full signature, Cert. and CRL 305 has been included with only one session key 220. The message sent to the mobile device of user B is an example of a message that was encrypted first and signed second. In this case, the full collection of encrypted session keys 210, 215, 220 are present, but only the digital signature portion 315 of the signature information is sent. In both cases, a message body portion of the message 200, 310 remains similar as transmitted from the sender, and only the other MIME parts have been re-organized to allow for a reduced over-the-air transmission of information to the mobile devices 100.

When user A opens the message, the single session key is decrypted and the message is decrypted to expose the signature component. A digest of the message is then taken and compared against the signed digest value in the digital signature. If the digests match and the digest signature is verified using the sender's private key, then the digital signature is verified. At user B's mobile device, the digital signature is first verified, and then the correct session key is located and decrypted. Once the session key for the user is found and decrypted, the message can be decrypted to obtain the full contents.

The preceding addressed re-organizing the message before sending it to the user of the mobile device. This next example describes different ways to pre-process the message to reduce data that must be transmitted over the air. The largest advantage of the pre-processing method is that it deals very well with messages that are both signed and encrypted, which are the most difficult messages to re-organize to reduce size. These pre-processing methods are most feasible if strong security is already in place between the corporate firewall and the user's mobile device, for example by using a 'wireless-friendly' security solution from the company's location to the mobile device. However, it could be said that any proposed e-mail secure solution will have flaws if the company's own corporate location does not have office and desktop security in place. Without company security it might be possible to sneak into any office and just read another person's mail at his or her own desktop. Therefore this kind pre-processing of S/MIME to a wireless-friendly security method, done completely behind the company's firewall, should be considered very secure for most companies.

Figure 7:
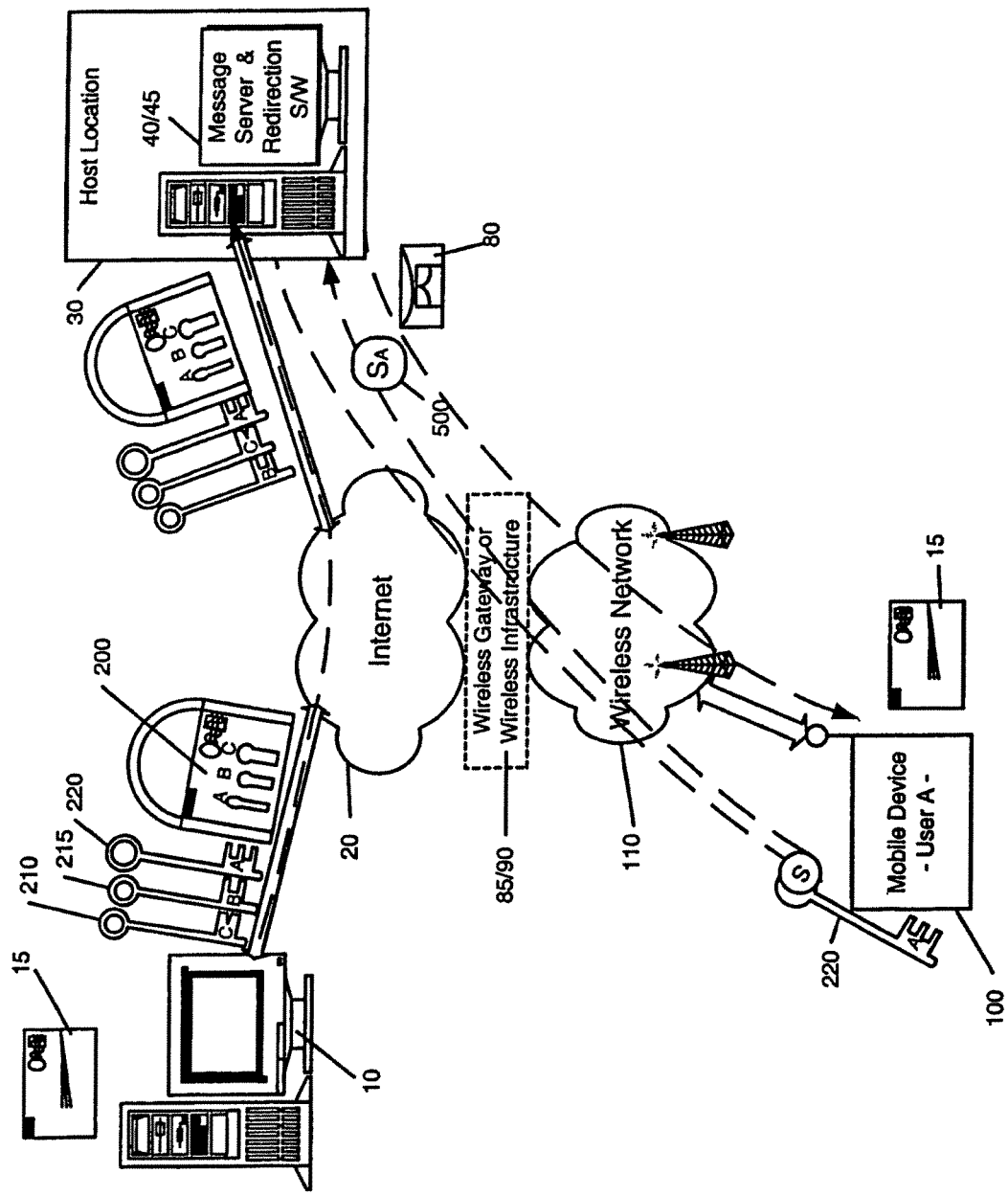
FIG. 7 is an example of how the system and method can pre-process S/MIME or public-key encrypted messages before they are sent to the mobile device.

In reference now to FIG. 7, this illustration is the first of two methods for dealing with messages that have been encrypted using a public key mechanism like S/MIME. Both FIG. 7 and FIG. 10 use this first method. This first method offers the strongest encryption support of the two methods but requires more over-the-air steps and more CPU and RF power resources on the mobile device. The steps used in this first method can handle the case where: (1) the company's mail system and the user's mobile device have individual private and public key pairs, or (2) the company's mail system and the user's mobile device have the same private and public key pairs but the messaging server and redirection software do not have access to the private key. This later situation is often the case when the private key is kept on a special smart-card or hardware-based key reader system. The biggest challenge with this mechanism is to deal with the fact that only the device has a copy of the private key that can decrypt the session key to decrypt their message.

In FIG. 7, a user enters a message 15 at workstation 10. The user then decides to encrypt the message using a randomly created session key and encrypts the session key with the public key of every intended recipient. In this example, the message might either be addressed to both the user's desktop mail account and the user's wireless mail account, i.e. when they both are using different public encryption keys. However, it is more likely that the message will be addressed to the person's corporate account directly. It is possible to share the private key between the desktop 35 and the mobile device 100 by loading the private key into the mobile device 100 over the serial port 50 as shown in FIG. 1. To perform this, the user would insert their smart-card into a card reader and run a component of the redirection software 45 to load the private key from the card reader directly into a memory of the mobile device 100. A full detailed description of the mobile device 100 is included with FIG. 14. This shared private key is used by both the desktop and the mobile device 100 as a way to extend the mirrored e-mail concept between the two locations.

It is assumed that the necessary public keys have been retrieved by the sender from local memory, or a local or Internet-based PKS. The encoded message 200 and the associated encrypted session keys 210, 215, 220 are sent to one or more recipients or destination host locations 30. A specific machine connected to the Internet 20 receives the message and the message is given to the message server 40 for processing. This processing triggers the redirection software 45 to detect the new message for the mobile user and to extract it from the message server 40. Since the session key is encrypted with a specific public key of the mobile device 100, or alternatively the private key used by the user is not accessible from a piece of software running on the server 40, the redirection software 45 extracts the correct session key 220 for the mobile device 100 and sends it to the mobile device 100. After extracting the correct session key for the mobile user, the redirection software 45 builds an empty message that only contains the encrypted session key 220. The mobile device 100 receives this empty message and extracts the encrypted session key 220 from the message. The mobile device 100 then decrypts the encrypted session key to recover the original session key 500 and sends it back to the host location 30 and redirection software 45. The redirection software 45 then uses this decrypted session key 500 to decrypt the entire message on behalf of the user. This reduces the amount of complex public key decryption operations that must be performed on the mobile device 100 and leaves the larger decryption operation on the entire message to the redirector S/W 45. Additionally, this allows the redirector software 45 to redirect only portions of the message, in the case of a very large e-mail message. A message 80 is then constructed and sent to the mobile device, and will normally be encrypted using a wireless-friendly encryption method. The message 80 can then be decrypted at the mobile device 100 and the original message 15 is presented to the user.

Figure 8:
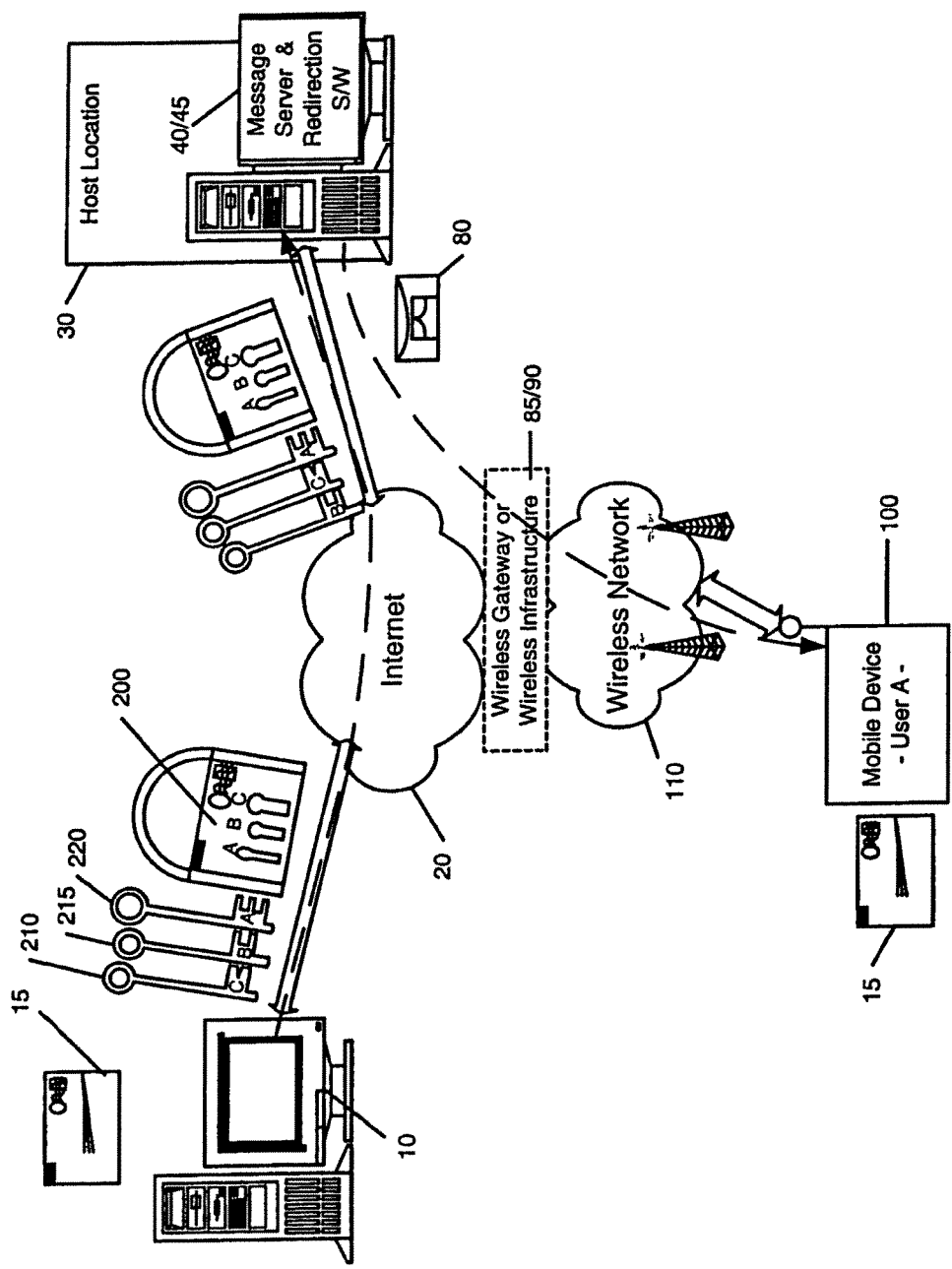
FIG. 8 is another example of how the system and method can pre-process S/MIME or public-key encrypted messages before they are sent to the mobile device.

Another example of handling public key encrypted messages that use methods like S/MIME is shown in FIG. 8. This second method focuses on a situation where the desktop and the mobile device share a common private key, and the key is accessible to the mail server and redirection software. As described above, this may be an unlikely scenario given how current private key technology is evolving. However, this method does have the advantage of reducing the number of steps in the process, removes the need to send a decrypted session key over the air, and reduces the number of public key operations the mobile device must perform.

Turning now to FIG. 8, a user composes an e-mail message 15 at workstation 10. A session key is created and is used to encrypt this message. This session key is then encrypted with the public key of every recipient. In this example, the mobile device 100 does not have its own public key but has received its private key over the serial port 50 as described in conjunction with FIG. 1. This shared private key is used by both the desktop 35 and the mobile device 100 as a way to extend the mirrored e-mail concept between the two locations.

The message 200 and session keys 210, 215, 220 are sent to one or more recipients or host locations 30 based on the recipient list. The message is received by a computer that is connected to the Internet 20 and passed to a message server 40 that processes the message and places it into the user's mailbox. This triggers the redirection software 45 to extract the message from the message server 40 and detect that it has been encrypted using a public key. Instead of sending the message directly to the mobile device 100, the redirection software 45 uses the saved private key shared with the device to decrypt the session key 220. The session key is then used to decrypt the message itself. Once the message is decrypted to clear text, it is encrypted again using a wireless-friendly encryption method and transmitted to the mobile device 100. The mobile device 100 decrypts the message and presents it to the user in its original form 15. This procedure allows the mobile device 100 the fastest delivery time, with the least amount of public key operations, which tend to be very CPU and power intensive on the mobile device 100.

Figure 9:
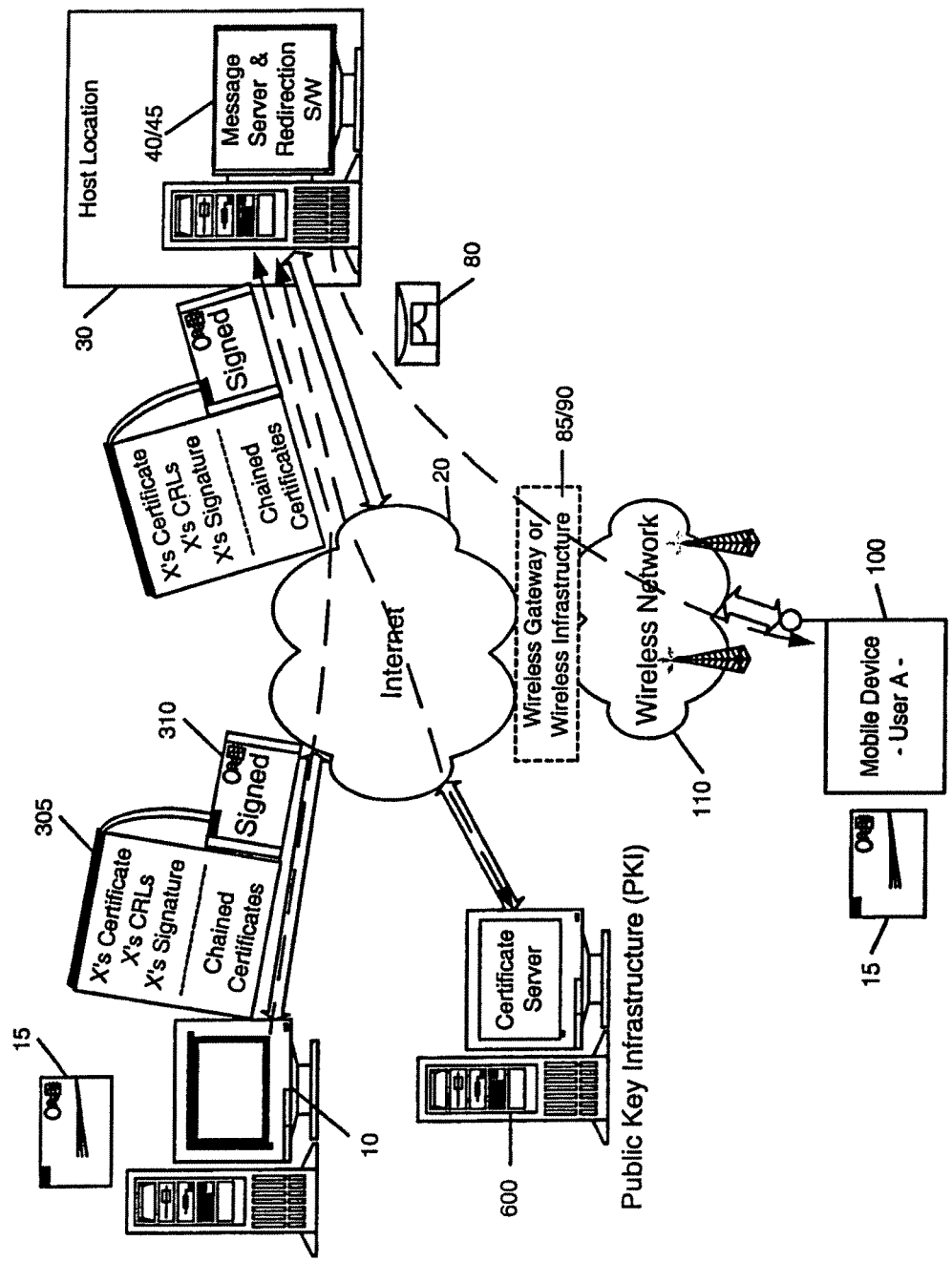
FIG. 9 is an illustration of how the system and method can pre-process S/MIME signed messages before they are sent to the mobile device.

In FIG. 9, an example of signed message pre-processing is shown. The host location 30 of the mobile device user performs the signature verification on behalf of the mobile device user, thus saving the transmission of bulky signature data. This pre-processing transfers the sender authentication step from the mobile device user to the host system.

As above, an e-mail message 15 is created and signed by user X. The signed message 310 is transmitted with all signature components 305 to one or more destinations or host locations 30. A machine connected to the Internet 20 receives the signed message and it is given to the message server 40. The redirection software 45 detects the new message for user A and it is extracted for processing. The redirection software 45 detects that the message has been signed, so it goes through the process of finding the public key of the sender. The public key could come from a local storage area or from a Public Key Infrastructure (PKI) 600 somewhere on the Internet 20, for example. Once the public key of the sender is retrieved, the digital signature can be verified on behalf of the mobile device user. Whether or not the signature verifies, an indication is included in the message 80 that is transmitted to the mobile device 100. As shown, the original message 15 is re-packaged into an electronic envelope before it is sent to the mobile device 100. This electronic envelope is then removed at the mobile device 100 before the message is presented to the user.

Figure 10:
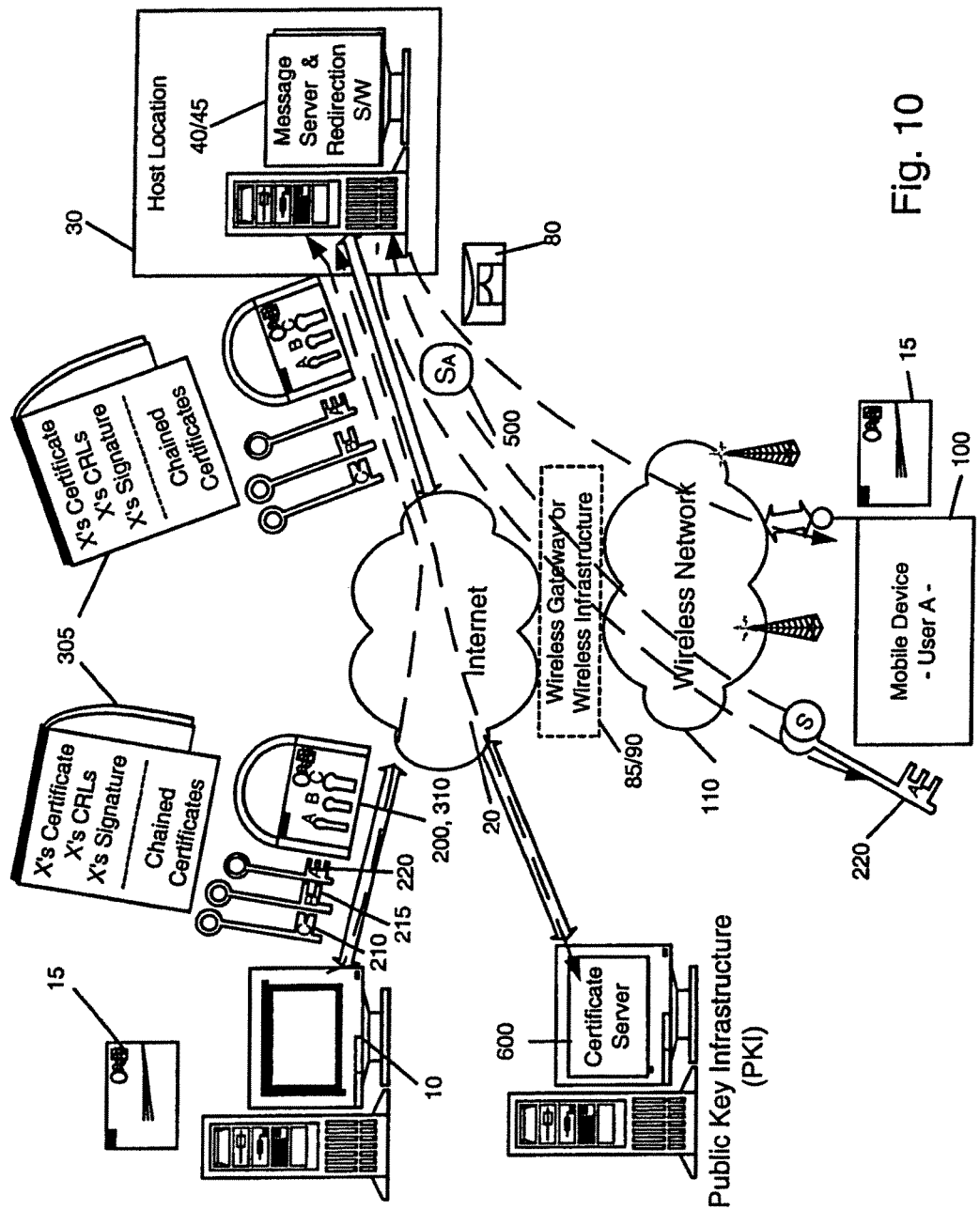
FIG. 10 is an illustration of how the system and method can pre-process signed and encrypted messages before they are sent to the mobile device.

In FIG. 10, a combination of the operations described above and shown in FIGS. 7 and 9 are being used at once. In this example, a message has been signed then encrypted, or encrypted and then signed. The order of the operation is not important, as this method can handle either operation being performed first.

The e-mail message 15 is first composed by user X. If the user X has asked for the message 15 to be signed first and then encrypted, the first step is to generate a digital signature, as described above, and the digital signature, possibly along with one or more Certs and CRLs, will be attached to the message. Next, a random session key which will be used to encrypt the message 15 including the digital signature, and any Certs and CRLs. Then the session key is further encrypted using the public key of each destination recipient. If the user has asked for the message to be encrypted and then signed, the steps are slightly different. In this case, the random session key is generated first and the message is encrypted using it, without the including the digital signature, Certs and CRLs. Then the session key is encrypted using the public key of each recipient and a RecipientInfo component is created. All the keys and the RecipientInfo list are attached to the message. Once this is complete, a digital signature of the message, session keys and RecipientInfo list is generated using the senders private key. For working with public and private keys, it has been assumed that the necessary public keys have been retrieved from local memory or a PKS. It is also assumed that the sender does not necessarily know whether a specific recipient is mobile since the mobile device 100 and the desktop 35 share the same private key. It is possible to share the private key between the desktop 35 and the mobile device 100 by loading the private key into the mobile device 100 over the serial port 50 as shown in FIG. 1 and described above.

The encoded message 200, 310, the associated encrypted session keys 210, 215, 220, and the associated signature information 305 are all sent to the host location 30 and possibly other recipients. A specific machine connected to the Internet 20 receives the message and the message is given to the message server 40 for processing. This processing triggers the redirection software 45 to detect the new message for the mobile user and to extract it from the message server 40. Since the message has been both signed and encrypted, several additional steps are performed. If the message has been signed first and then encrypted, the redirection software 45 first sends the correct session key 220 to the mobile device 100 for decryption. Once the decrypted session key 500 is returned to the redirection software 45, the message can be fully decrypted and the signature information extracted. The signature is then verified by retrieving the public key of the sender. This key might be stored in the location memory or disk location or accessible through a public key infrastructure 600, accessible on the Internet 20 in this example. Whether the sender's signature does or does not verify, the message is re-encrypted using a wireless-friendly method, and resultant message 80 is transmitted to the mobile user 100 with an indication that the message had been signed and whether or not the signature verified. The mobile user may then decrypt the transmitted message 80 to retrieve the original message 15, an indication that the message had been signed, and whether or not the signature was verified.

If the message has been encrypted first and signed second, the redirection software 45 verifies the digital signature as described above. Whether the sender's signature verifies, the correct session key 220 may be sent to the mobile device 100 for decryption. Once the decrypted session key 500 is returned to the redirection software 45, the message can be fully decrypted and sent to the user using a wireless-friendly encryption algorithm. The mobile device 100 receives and processes the message 80 and presents the original message 15, as well as signature indications, to the mobile user.

It should be noted that a digital signature need not necessarily be verified in order for a user to view a message. By decrypting the message at the host location 30, the user can then choose to view the message even if the signature was not verified.

Figure 11:
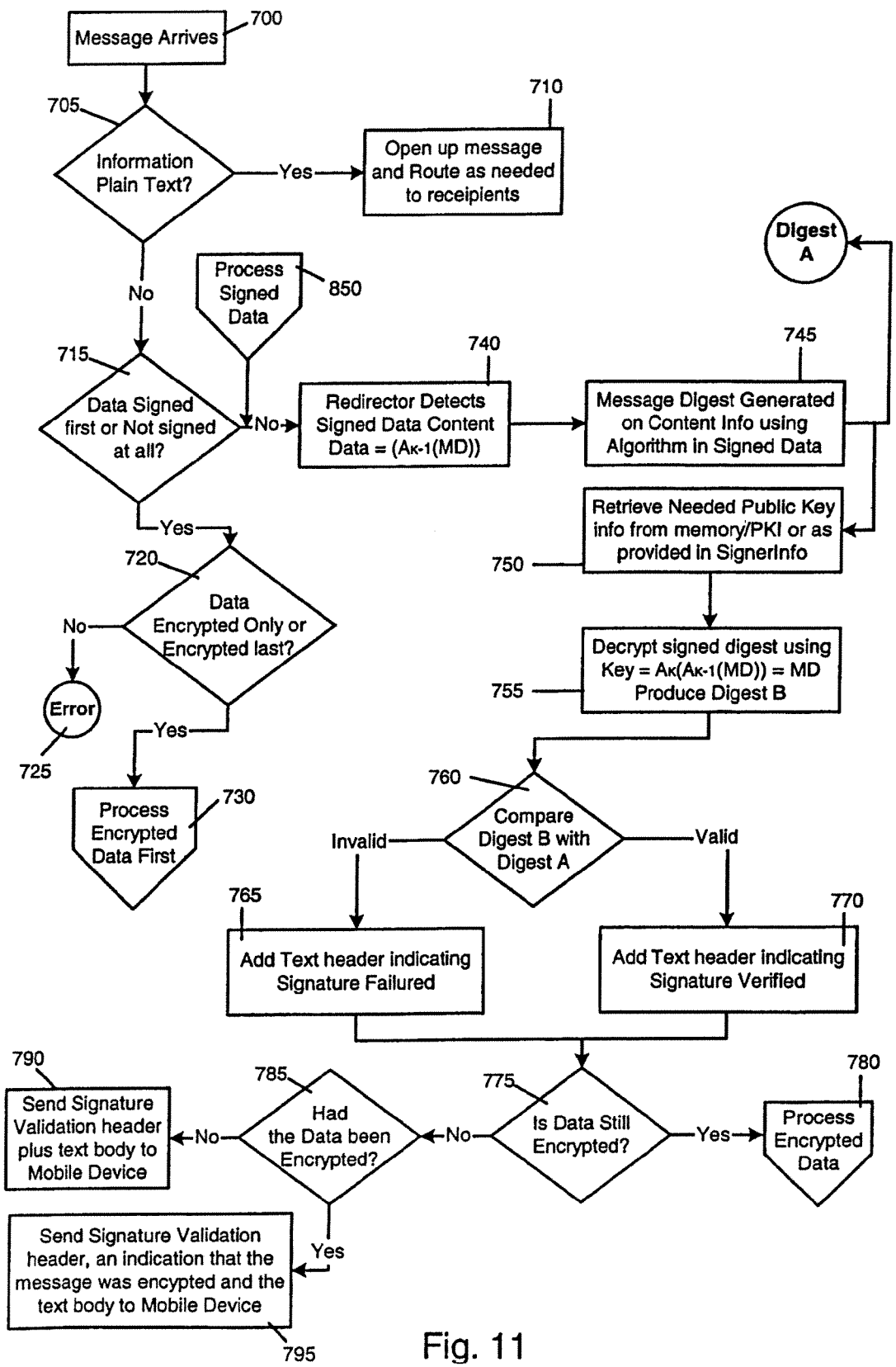
FIG. 11 shows a flow chart of how the host system may pre-process signed, encrypted, or signed and encrypted messages before sending them to the mobile device.

FIG. 11 shows a flow chart of how the host system may pre-process signed, encrypted, or signed and encrypted messages before sending them to the mobile device. FIG. 11 focuses more directly on messages that have been signed, while FIG. 12 extends the flow diagram to deal with messages that may be encrypted. In this flow diagram, it is assumed that the message server 40 has received the message and has placed it into its message storage location. It is also assumed that the redirection software 45, working in conjunction with the message server 40, has detected the message arrival.

Turning now to FIG. 11 in detail, the method begins at step 700, when a message arrives from a message sender within the Internet or Intranet and is detected by the redirection software 45. The first step for the redirection software 45 is to check to see if the message if in plain text or not, at 705. This check can be easily performed by checking the MIME type, or looking for attachments with a certain format and MIME value. If the information is plain text, then it is opened and routed to each of the mobile devices as normal, as shown at 710. If the information is not plain text, then a check is made at step 715 to see if the message was signed first or not signed at all. If the message was signed first, this would mean the message had been encrypted last and the encryption would have to be processed before the signature. Otherwise, if the message was signed last, then the digital signature must be processed first before processing the encrypted component. If the message was signed first or not signed at all, then an additional test for encryption is performed at step 720. If the message is not encrypted only (i.e., not signed) or was not encrypted last, then there must be an error or the message has a format that the redirection software 45 cannot handle, and an error condition 725 is declared. The particular error handling procedures may be dependent upon the implementation, and may be configurable in the redirection software. If the message was encrypted last, or if the message was only encrypted and not signed, then the method proceeds to process the encrypted component first, at 730.

If the message has been signed last 715, or if the message was signed only and not encrypted, then the redirector detects the signed data content via a digital signature at 740. Another path into this area is after the encryption component has been processed and removed (850). This path enters from FIG. 12, and will be described in more detail below. This is the case when the data is signed first and encrypted second.

In this example, the MD (message digest) is encrypted with User A's private key, represented by $K^{-1}$ to produce the digest signature $A_K^{-1}(MD)$. At step 745, a new message digest is generated on the content using a known algorithm or using an algorithm selected in the signed data. This produces a digest A, which will be later compared to the digest sent by the original message sender. After this step, the public key of the sender is retrieved from memory, from a PKI, or it may also be included in the SignerInfo component of the message, at step 750. Then, at step 755, the original digest is decrypted using the public key of the sender to produce digest B. The operation is shown as taking the User A's public key $A_K$ and applying it to the private key encrypted $A_K(A_K^{-1}(MD))$ which produces MD. Finally, the digest generated from the message digest A is compared to the decrypted digest B to see if the signature is valid and the message was not tampered with, at step 760. If the signature is invalid, then a text header is added to the message at step 765 to indicate that the signature verification failed. Otherwise, a text header is added to the message at step 770 to indicate the signature was valid.

Alternatively, as described above, a digital signature may include both a message digest and a digest signature. In this case, digest A would be compared with the digest in the digital signature, and the digest signature would also be verified using the sender's public key. Verification of the digital signature is then dependent upon both a digest match and verification of the digest signature.

Now that the signature has been processed, a check is made to see if the data is still encrypted, at step 775. The encrypted portion may have been already processed, for example if the signature verification path had been entered via path 850. If the data is still encrypted, then the method proceeds to decrypt the data via step 780, as detailed in FIG. 12. If the data is no longer encrypted, then a check is performed at step 785 to determine if it had been encrypted. If it had been encrypted, then a message that contains the signature validation header, an indication that the message was encrypted using a public key mechanism, and the original message body text, is constructed and sent to the user at step 795. If the message was never encrypted a message that includes the signature validation header plus the message body is sent to the mobile device 100 at step 790. Not shown in this flow chart is the encoding, compression and encryption schemes optionally employed by the redirection software 45 to ensure secure to the mobile device.

Figure 12:
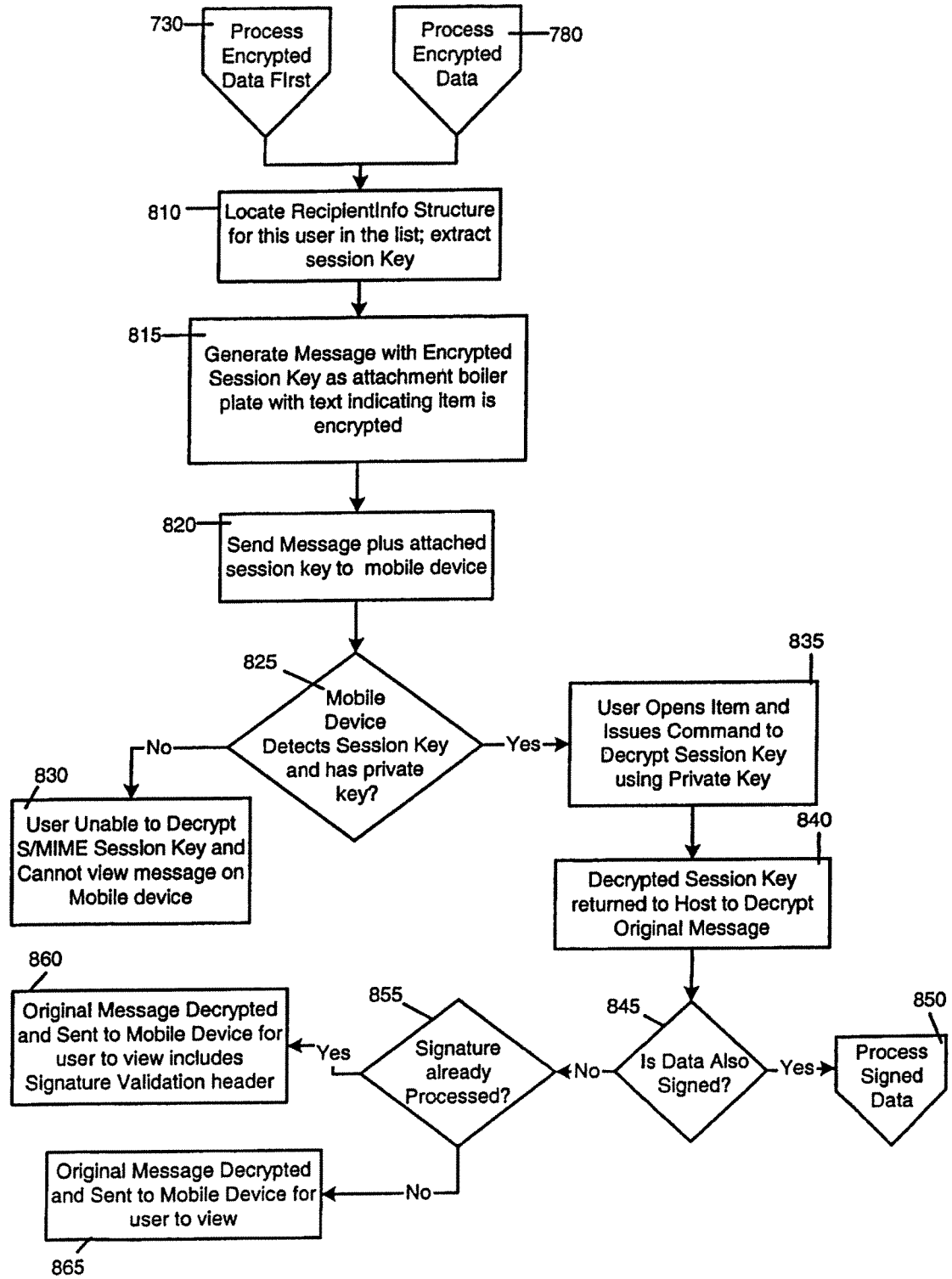
FIG. 12 is a continuation of the flow chart shown in FIG. 11 and focuses on the processing of encryption before sending it to the mobile device.

FIG. 12 is a continuation of the flow chart shown in FIG. 11 and focuses on the processing of encryption before sending it to the mobile device. To enter this Figure there are two paths, one when the message has been signed first and encrypted second or was only encrypted (730), and the other when the message was encrypted first and signed second and the signature has already been processed (780).

The first step in processing the encrypted data is to locate the RecipientInfo list structure and locate the session key for this particular user, at step 810. The next step 815 is to generate a canned message for the mobile device 100 that contains the session key. This message will have text for the user to give them information about the message, like the size, date and originator of the message, with an indication that it is encrypted. The message is sent to the mobile device at step 820 with a boilerplate message. The mobile device 100 then receives the message, detects the session key and confirms there is a private key that can be used to decrypt the session key, at step 825. If the device does not have the correct private key, or if it has not loaded any private key, or the user does not want to decrypt the message, then the message cannot be viewed by the user, as indicated at 830. Otherwise, as an optional step, the user may be given the choice to decrypt the message via a menu or other user interface of the mobile device, at step 835. The decrypted session key is then passed back to the host and the original message is decrypted at step 840.

Once the decryption is complete, a test is performed to see if the message is also signed. If the message is also signed, then the method proceeds to step 850 to process the digital signature, as shown in FIG. 11 and described above. If the message is not signed, then a further test is performed at step 855 to see if the signature was already processed. It is possible to enter the encryption processing in FIG. 12 via path 780, when the signed component was already processed. If the signature was already processed, then the decrypted message with the signature header are all sent to the mobile device for viewing, at step 860. Otherwise, if the message was not signed, then the original message is decrypted and sent to the mobile device to view, at step 865.

Figure 13:
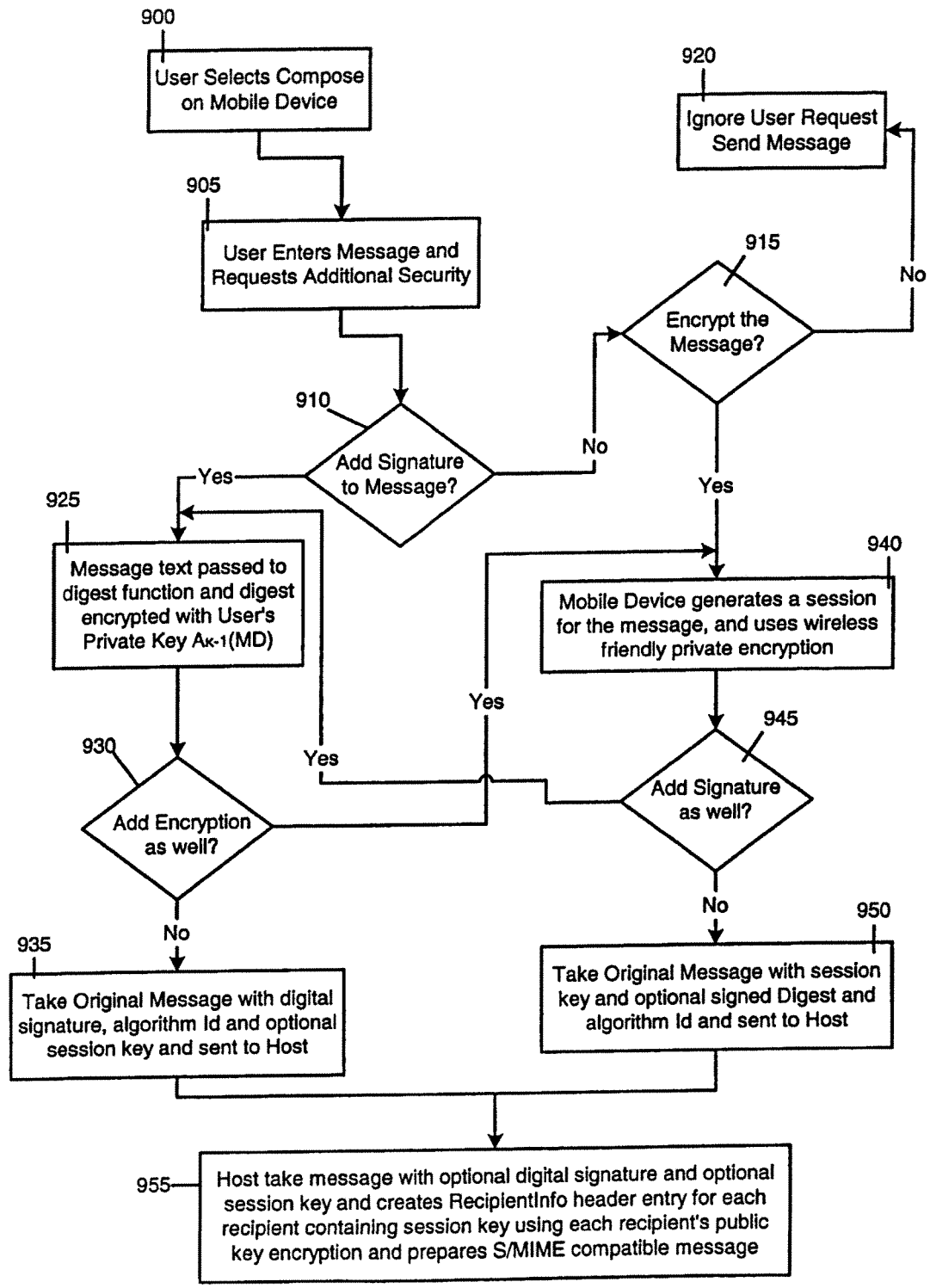
FIG. 13 shows a flow chart of how the mobile device may make use of the host system for signing and encryption of messages using S/MIME techniques.

FIG. 13 shows a flow chart of how the mobile device may make use of the host system for signing and encryption of messages using S/MIME techniques. Similar to the example of pre-processing data by the host going to the mobile device, the mobile device may allow the host to post-process data from the mobile device. In this flow chart, the user has the ability to add encryption, signatures or both encryption and signature components to the message.

The first step 900 in FIG. 13 is the user selecting a "compose" option on the mobile device. The user enters a message and requests additional security on the message at step 905. This might include, for example, S/MIME, PGP or some other proprietary encoding mechanisms. Then, at step 910, a test is performed to see if the user wants to add a signature to the message. If not, then a test is performed at step 915 to see if they want to add encryption. If the user has not selected to add either signature or encryption, then the user's request for additional security is ignored, and the message is sent according to normal procedures, at step 920.

If the user does want to add a signature, then the message text is passed to a digest function and the digest is encrypted with the User's Private key $A_K^{-1}(MD)$, at step 925. As described above, encryption of the digest is only one example of a transformation that could be used to sign a digest. After this is complete, a further test is performed to see if the user also wants to add encryption to the message, at step 930. As those skilled in the art will appreciate, the test at step 930 assumes, or alternatively may check, that the message has not already been encrypted, to avoid an endless loop from occurring. If the user does not want to add encryption, or if encryption is already added, a message is prepared and sent to the host system at step 935. The original message (now optionally encrypted), the signed digest, the algorithm id, and the optional session key used in the encryption are all sent to the host system. It may also be desirable to encode, compress and encrypt all of this information using a wireless-friendly method.

If the user didn't want to add a signature to the message but does want to add encryption, or if they want to add encryption after adding the signature, the method proceeds to step 940. At this step, the mobile device will generate a session key, based on the private key for this mobile user stored on the device for example. The mobile device software might optionally use the session key to encrypt the message, or use a separate wireless-friendly encryption method if one is already in place. Once this is complete, a test is performed at step 945 to see if the user wants to sign the message as well. As with step 930 described above, step 945 assumes, or alternatively checks, that the message has not already been signed, to avoid an endless loop. If the user does want a signature added, then the method proceeds back to step 925 to add the digital signature. Otherwise, if the user does not want a signature, or if a signature has already been added, a message is prepared for the host at step 950. Step 950 now takes the original message that is now encrypted, includes the session key used for the encryption, adds the optional signed digest and the algorithm id and sends all this to the host 950. As above, all this information may be encoded, compressed and encrypted using a wireless-friendly method.

When the host receives this message from the mobile device 100 at step 955, it takes the components that are present, which may or may not include the digital signature, the algorithm id and the session key and prepares a full S/MIME or PGP message to send to the destination 955. The processing done on behalf of the mobile device user will include creating an encrypted session key for every recipient of the message, creating a RecipientInfo list, creating a signature section with the public key of the user, a Certificate and the Certificate Revocation List (CRL) for that company. These final components can take the message from 2,000 bytes into 10,000 bytes in length. Once this reconstruction is complete the message is transmitted via the message server 40 to all destination recipients either Internet based or Intranet based within the company.

Figure 14:
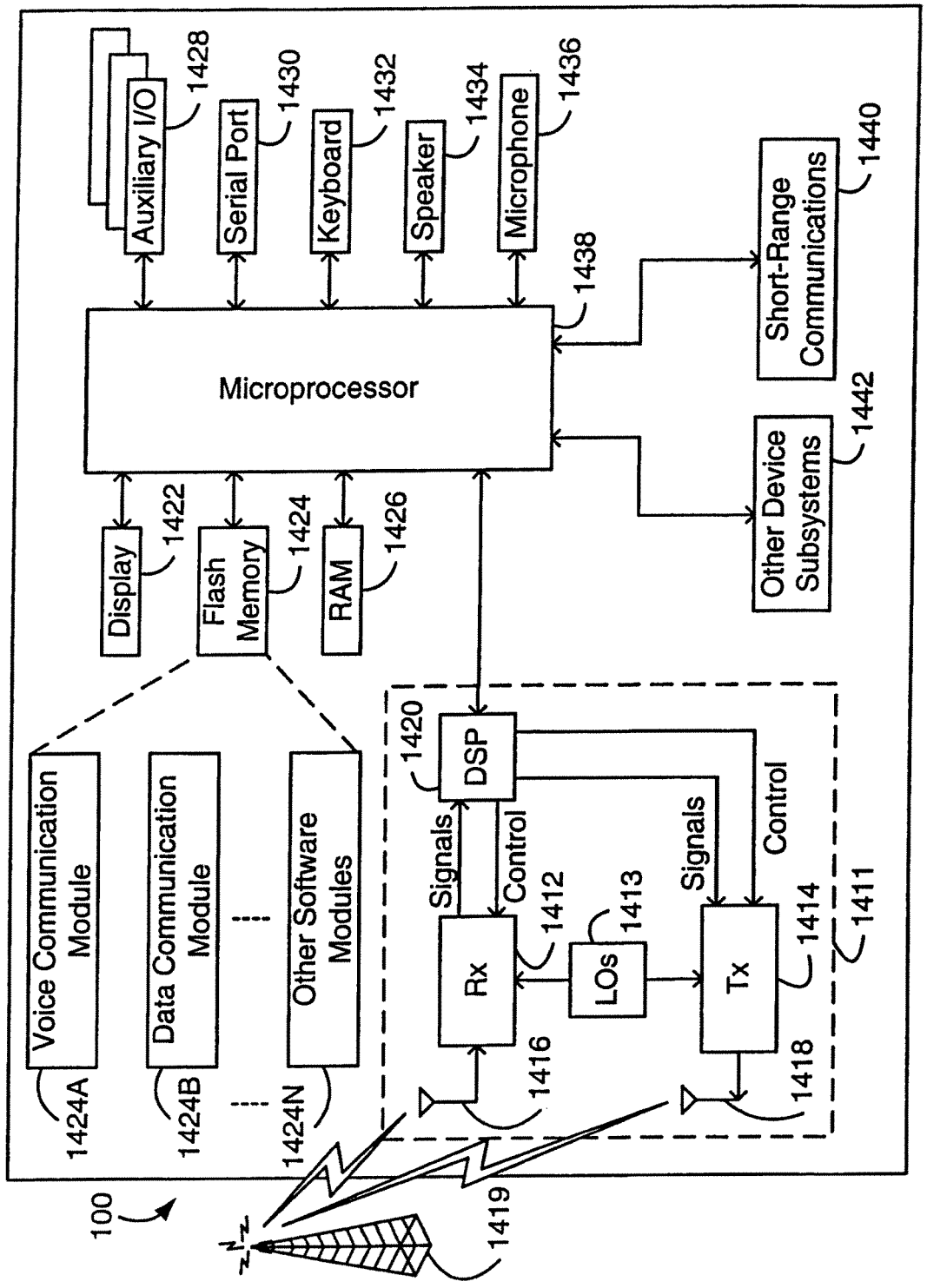
FIG. 14 is schematic diagram of components in an example wireless data communication device that could be used with the system and method.

Turning now to FIG. 14, a block diagram of an exemplary wireless communication device that could be used with the systems and methods described herein is shown. The mobile communication device 100 is preferably a two-way communication device having voice and/or data communication capabilities. The device preferably has the capability to communicate with other computer systems on the Internet. Depending on the functionality provided by the device, the device may be referred to as a data messaging device, a two-way pager, a cellular telephone with data messaging capabilities, a wireless Internet appliance or a data communication device (with or without telephony capabilities). As mentioned above, such devices are referred to generally herein simply as mobile devices.

The dual-mode device 100 includes a transceiver 1411, a microprocessor 1438, a display 1422, Flash memory 1424, RAM 1426, auxiliary input/output (I/O) devices 1428, a serial port 1430, a keyboard 1432, a speaker 1434, a microphone 1436, a short-range wireless communications sub-system 1440, and may also include other device sub-systems 1442. The transceiver 1411 preferably includes transmit and receive antennas 1416, 1418, a receiver (Rx) 1412, a transmitter (Tx) 1414, one or more local oscillators (LOs) 1413, and a digital signal processor (DSP) 1420. Within the Flash memory 1424, the device 100 preferably includes a plurality of software modules 1424A-1424N that can be executed by the microprocessor 1438 (and/or the DSP 1420), including a voice communication module 1424A, a data communication module 1424B, and a plurality of other operational modules 1424N for carrying out a plurality of other functions.

The mobile communication device 100 is preferably a two-way communication device having voice and data communication capabilities. Thus, for example, the device may communicate over a voice network, such as any of the analog or digital cellular networks, and may also communicate over a data network. The voice and data networks are depicted in FIG. 14 by the communication tower 1419. These voice and data networks may be separate communication networks using separate infrastructure, such as base stations, network controllers, etc., or they may be integrated into a single wireless network. References to the network 1419 should therefore be interpreted as encompassing both a single voice and data network or separate networks.

The communication subsystem 1411 is used to communicate with the network 1419. The DSP 1420 is used to send and receive communication signals to and from the transmitter 1414 and receiver 1412, and may also exchange control information with the transmitter 1414 and receiver 1412. If the voice and data communications occur at a single frequency, or closely-spaced set of frequencies, then a single LO 1413 may be used in conjunction with the transmitter 1414 and receiver 1412. Alternatively, if different frequencies are utilized for voice communications versus data communications, then a plurality of LOs 1413 can be used to generate a plurality of frequencies corresponding to the network 1419. Although two antennas 1416, 1418 are depicted in FIG. 14, the mobile device 100 could be used with a single antenna structure. Information, which includes both voice and data information, is communicated to and from the communication module 1411 via a link between the DSP 1420 and the microprocessor 1438.

The detailed design of the communication subsystem 1411, such as frequency band, component selection, power level, etc., will be dependent upon the communication network 1419 in which the device 100 is intended to operate. For example, a device 100 intended to operate in a North American market may include a communication subsystem 1411 designed to operate with the Mobitex or DataTAC mobile data communication networks and also designed to operated with any of a variety of voice communication networks, such as AMPS, TDMA, CDMA, PCS, etc., whereas a device 100 intended for use in Europe may be configured to operate with the GPRS data communication network and the GSM voice communication network. Other types of data and voice networks, both separate and integrated, may also be utilized with the mobile device 100.

Depending upon the type of network 1419, the access requirements for the dual-mode mobile device 100 may also vary. For example, in the Mobitex and DataTAC data networks, mobile devices are registered on the network using a unique identification number associated with each device. In GPRS data networks, however, network access is associated with a subscriber or user of a device 100. A GPRS device typically requires a subscriber identity module ("SIM"), which is required in order to operate the device 100 on a GPRS network. Local or non-network communication functions (if any) may be operable, without the SIM, but the device 100 will be unable to carry out any functions involving communications over the network 1419, other than any legally required operations, such as '911' emergency calling.

After any required network registration or activation procedures have been completed, the dual-mode device 100 may send and receive communication signals, preferably including both voice and data signals, over the network 1419. Signals received by the antenna 1416 from the communication network 1419 are routed to the receiver 1412, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 1420. In a similar manner, signals to be transmitted to the network 1419 are processed, including modulation and encoding, for example, by the DSP 1420 and are then provided to the transmitter 1414 for digital to analog conversion, frequency up conversion, filtering, amplification and transmission to the communication network 1419 via the antenna 1418. Although a single transceiver 1411 is shown in FIG. 14 for both voice and data communications, it is possible that the device 100 may include two distinct transceivers, a first transceiver for transmitting and receiving voice signals, and a second transceiver for transmitting and receiving data signals.

In addition to processing the communication signals, the DSP 1420 may also provide for receiver and transmitter control. For example, the gain levels applied to communication signals in the receiver 1412 and transmitter 1414 may be adaptively controlled through automatic gain control algorithms implemented in the DSP 1420. Other transceiver control algorithms could also be implemented in the DSP 1420 in order to provide more sophisticated control of the transceiver 1411.

The microprocessor 1438 preferably manages and controls the overall operation of the dual-mode mobile device 100. Many types of microprocessors or microcontrollers could be used here, or, alternatively, a single DSP 1420 could be used to carry out the functions of the microprocessor 1438. Low-level communication functions, including at least data and voice communications, are performed through the DSP 1420 in the transceiver 1411. Other, high-level communication applications, such as a voice communication application 1424A, and a data communication application 1424B may be stored in the Flash memory 1424 for execution by the microprocessor 1438. For example, the voice communication module 1424A may provide a high-level user interface operable to transmit and receive voice calls between the dual-mode mobile device 100 and a plurality of other voice devices via the network 1419. Similarly, the data communication module 1424B may provide a high-level user interface operable for sending and receiving data, such as e-mail messages, files, organizer information, short text messages, etc., between the dual-mode mobile device 100 and a plurality of other data devices via the network 1419. On the device 100, a secure messaging software application may operate in conjunction with the data communication module 1424B in order to implement the secure messaging techniques described above.

The microprocessor 1438 also interacts with other device subsystems, such as the display 1422, Flash memory 1424, random access memory (RAM) 1426, auxiliary input/output (I/O) subsystems 1428, serial port 1430, keyboard 1432, speaker 1434, microphone 1436, a short-range communications subsystem 1440 and any other device subsystems generally designated as 1442. For example, the modules 1424A-N are executed by the microprocessor 1438 and may provide a high-level interface between a user of the mobile device and the mobile device. This interface typically includes a graphical component provided through the display 1422, and an input/output component provided through the auxiliary I/O 1428, keyboard 1432, speaker 1434, or microphone 1436.

Some of the subsystems shown in FIG. 14 perform communication-related functions, whereas other subsystems may provide "resident" or on-device functions. Notably, some subsystems, such as keyboard 1432 and display 1422 may be used for both communication-related functions, such as entering a text message for transmission over a data communication network, and device-resident functions such as a calculator or task list or other PDA type functions.

Operating system software used by the microprocessor 1438 is preferably stored in a persistent store such as Flash memory 1424. In addition to the operating system and communication modules 1424A-N, the Flash memory 1424 may also include a file system for storing data. A storage area is also preferably provided in the Flash memory 1424 to store public keys, a private key, and other information required for secure messaging. The operating system, specific device applications or modules, or parts thereof, may be temporarily loaded into a volatile store, such as RAM 1426 for faster operation. Moreover, received communication signals may also be temporarily stored to RAM 1426, before permanently writing them to a file system located in the persistent store 1424.

An exemplary application module 1424N that may be loaded onto the dual-mode device 100 is a personal information manager (PIM) application providing PDA functionality, such as calendar events, appointments, and task items. This module 1424N may also interact with the voice communication module 1424A for managing phone calls, voice mails, etc., and may also interact with the data communication module 1424B for managing e-mail communications and other data transmissions. Alternatively, all of the functionality of the voice communication module 1424A and the data communication module 1424B may be integrated into the PIM module.

The Flash memory 1424 preferably provides a file system to facilitate storage of PIM data items on the device. The PIM application preferably includes the ability to send and receive data items, either by itself, or in conjunction with the voice and data communication modules 1424A, 1424B, via the wireless network 1419. The PIM data items are preferably seamlessly integrated, synchronized and updated, via the wireless network 1419, with a corresponding set of data items stored or associated with a host computer system, thereby creating a mirrored system for data items associated with a particular user.

The mobile device 100 may also be manually synchronized with a host system by placing the device 100 in an interface cradle, which couples the serial port 1430 of the mobile device 100 to the serial port of the host system. The serial port 1430 may also be used to enable a user to set preferences through an external device or software application, to download other application modules 1424N for installation, and to load Certs, keys and other information onto a device as described above. This wired download path may be used to load an encryption key onto the device, which is a more secure method than exchanging encryption information via the wireless network 1419.

Additional application modules 1424N may be loaded onto the dual-mode device 100 through the network 1419, through an auxiliary I/O subsystem 1428, through the serial port 1430, through the short-range communications subsystem 1440, or through any other suitable subsystem 1442, and installed by a user in the Flash memory 1424 or RAM 1426. Such flexibility in application installation increases the functionality of the device 100 and may provide enhanced on-device functions, communication-related functions, or both. For example, secure communication applications may enable electronic commerce functions and other such financial transactions to be performed using the device 100.

When the dual-mode device 100 is operating in a data communication mode, a received signal, such as a text message or a web page download, will be processed by the transceiver 1411 and provided to the microprocessor 1438, which will preferably further process the received signal for output to the display 1422, or, alternatively, to an auxiliary I/O device 1428. A user of dual-mode device 100 may also compose data items, such as email messages, using the keyboard 1432, which is preferably a complete alphanumeric keyboard laid out in the QWERTY style, although other styles of complete alphanumeric keyboards such as the known DVORAK style may also be used. User input to the device 100 is further enhanced with a plurality of auxiliary I/O devices 1428, which may include a thumbwheel input device, a touchpad, a variety of switches, a rocker input switch, etc. The composed data items input by the user may then be transmitted over the communication network 1419 via the transceiver 1411. Secure messages received by and to be transmitted from the mobile device 100 are processed by the data communication module 1424B or an associated secure messaging software application according to the techniques described above.

When the dual-mode device 100 is operating in a voice communication mode, the overall operation of the device 100 is substantially similar to the data mode, except that received signals are preferably output to the speaker 1434 and voice signals for transmission are generated by a microphone 1436. In addition, the secure messaging techniques described above might not necessarily be applied to voice communications. Alternative voice or audio I/O subsystems, such as a voice message recording subsystem, may also be implemented on the device 100. Although voice or audio signal output is preferably accomplished primarily through the speaker 1434, the display 1422 may also be used to provide an indication of the identity of a calling party, the duration of a voice call, or other voice call related information. For example, the microprocessor 1438, in conjunction with the voice communication module 1424A and the operating system software, may detect the caller identification information of an incoming voice call and display it on the display 1422.

A short-range communications subsystem 1440 may also be included in the dual-mode device 100. For example, the subsystem 1440 may include an infrared device and associated circuits and components, or a short-range wireless communication module, such as a "Bluetooth" module or an 802.11 module according to the Bluetooth or 802.11 specifications, respectively, to provide for communication with similarly-enabled systems and devices. It will be apparent to those skilled in the art that "Bluetooth" and 802.11 refer to sets of specifications, available from the Institute of Electrical and Electronics Engineers (IEEE), relating to wireless LANs and wireless personal area networks, respectively.

Having described in detail the preferred embodiments of the system, including the preferred methods of operation, it is to be understood that this operation could be carried out with different elements and steps. This preferred embodiment is presented only by way of example and is not meant to limit the scope of the present invention. For example, FIGS. 15 and 16 illustrate pre-processing and post-processing of messages involving wireless mobile communications devices.

Figure 15:
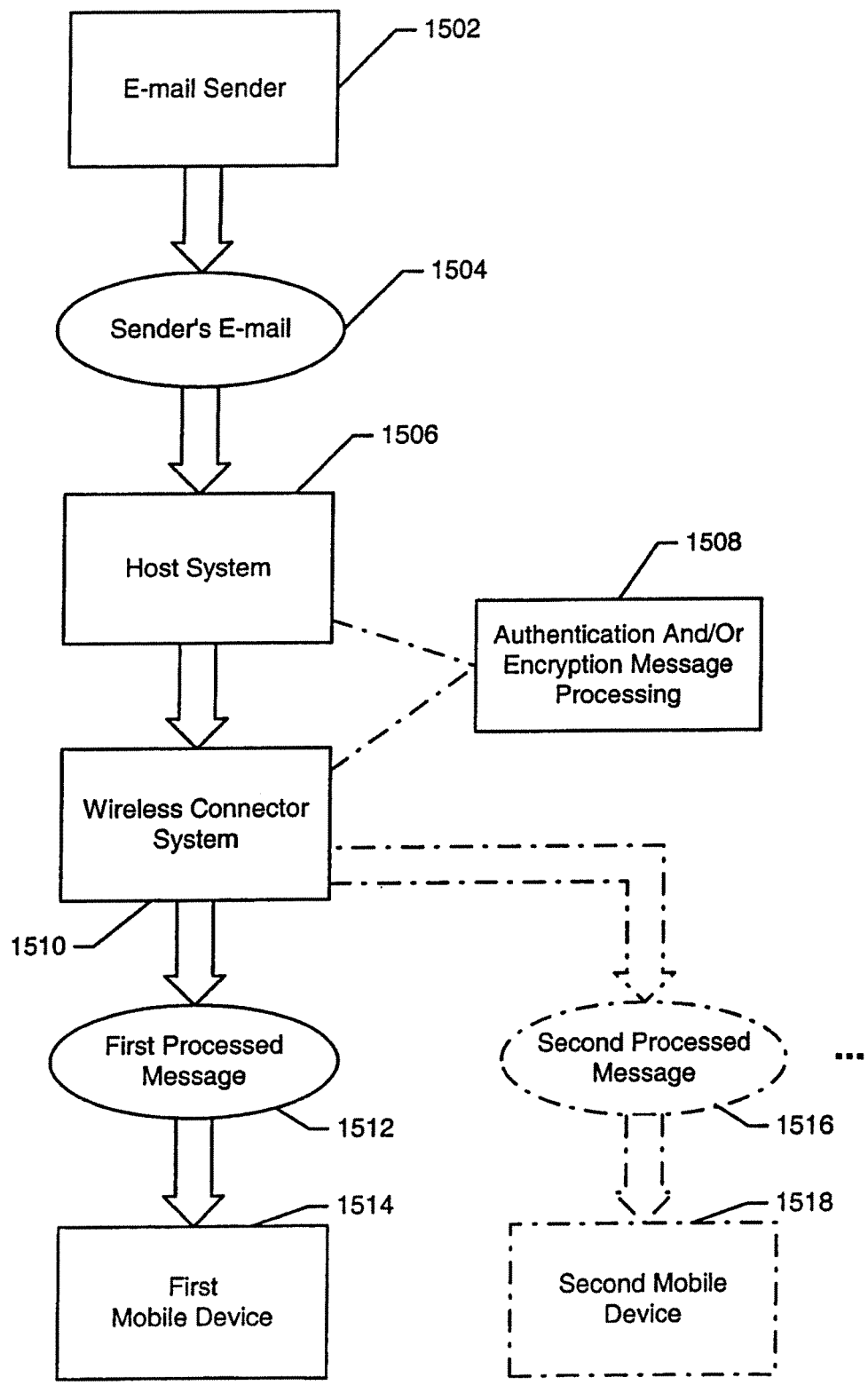
FIGS. 15 and 16 are block diagrams depicting processing of messages involving a mobile device.
Figure 16:
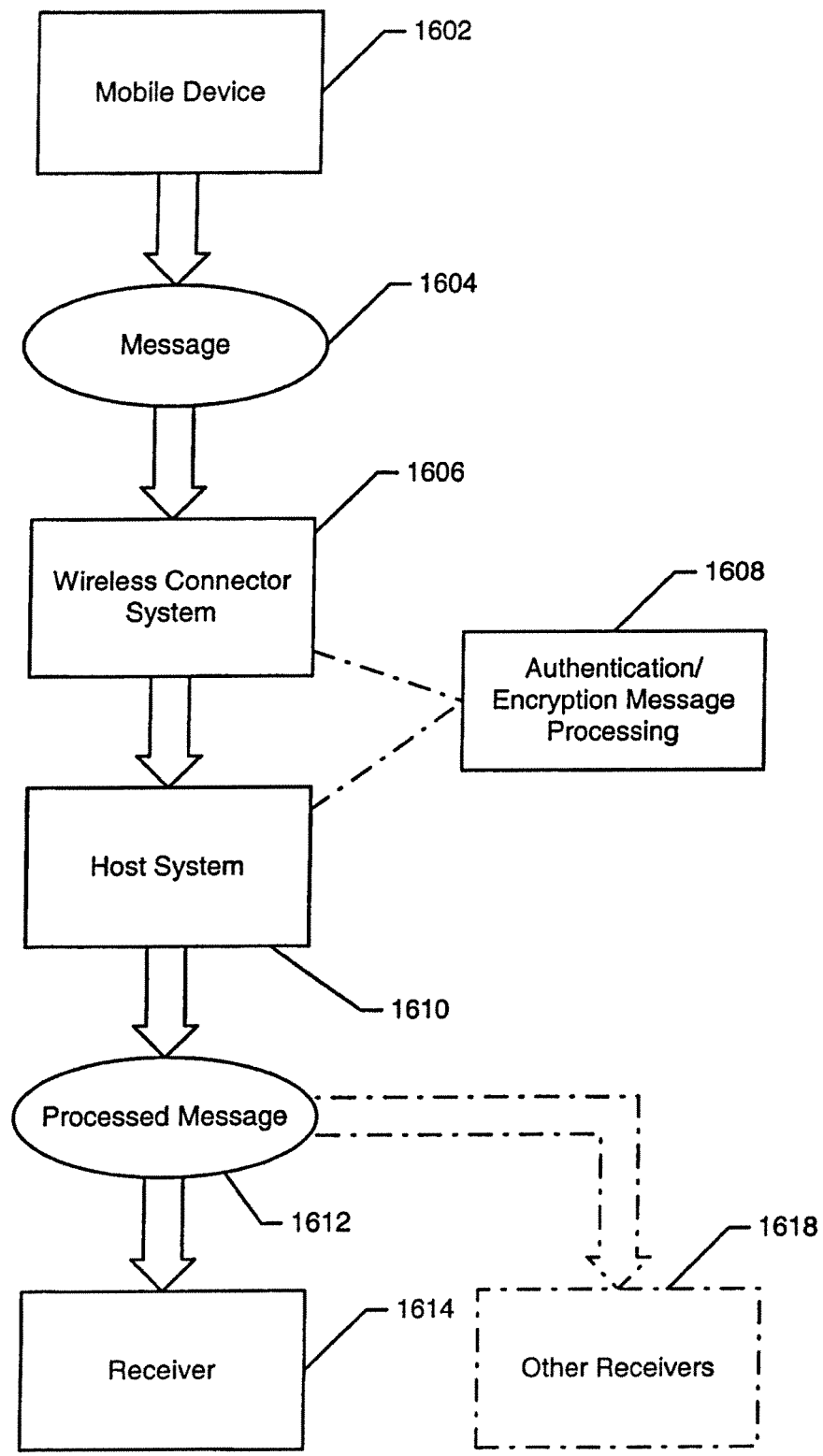

FIG. 15 depicts a pre-processing example wherein a host system 1506 receives a message 1504 from a message sender 1502 addressed to one or more message receivers. A wireless connector system 1510 generates a message 1512 for a mobile device 1514 that corresponds to a message receiver. The wireless connector system 1510 performs authentication and/or encryption message processing 1508 upon the sender's message 1504. Many types of processing may be performed, such as reducing the size of a sender's encrypted message by excluding some or all session keys not needed by a message receiver corresponding mobile device. Through processing 1508, the message 1512 transmitted to the mobile device 1514 is a modification of the sender's message 1504 with respect to authentication and/or encryption aspect(s). The mobile device 1514 contains memory for storing such pre-processed messages, such as volatile or non-volatile RAM (random access memory).

The sender's message 1504 is similarly processed if other mobile devices are identified by the wireless connector system 1510 to correspond to the recipients that should receive the sender's message 1504. In this way, messages (e.g., 1516) modified with respect to authentication and/or encryption aspect(s) (e.g., encoding aspects) are sent to other mobile devices (e.g., 1518).

It should be understood that such a system may be varied in many ways, such as allowing the processing 1508 to be performed by the host system 1506, or having the wireless connector system 1510 operate within the host system 1506 or operate on a different platform from the host system 1506. As a further example of the wide scope of the system's variations, the wireless connector system 1510 may use techniques other than redirection operations to transmit messages to mobile devices (e.g., 1514 and 1518).

FIG. 16 depicts a post-processing example wherein a wireless connector system 1606 receives a message 1604 addressed to one or more message receivers (e.g., 1614 and 1618) from a wireless mobile communication device 1602. Authentication and/or encryption message processing 1608 is performed upon the message 1604. Many types of processing may be performed, such as: removing signature-related information indication from a device's signed message and attaching signature-related information identified in the signature-related information indication to the signed message. The processed message 1612 may then be sent through the host system 1610 to one or more receivers (e.g., 1614 and 1618).

Such pre-processing and post-processing systems as described herein address many issues, such as the difficulty that current systems do not attempt to deliver entire S/MIME messages to a mobile device, due primarily to bandwidth and battery limitations associated with mobile devices. One difficulty is that S/MIME messages are usually too large to send effectively to a mobile device over a wireless communication network. If an entire S/MIME message is sent, either to or from a mobile device, it could use excessive amounts of memory and battery power just for a single message. Considering the time necessary for reception or transmission by a mobile device, the memory required for storage and the battery power required to handle the message exchange, a product that tried to support straight S/MIME would have undesirable qualities to the average business user. Another exemplary issue is that there are no currently available public key servers accessible to wireless networks and mobile devices. As a result, the use of public key cryptographic operations is very difficult and requires heavy caching operations at the mobile device to eliminate PKI requirements. In the area of exchanging secure e-mail messages, there are additional problems that include (1) the inability for mobile devices to retrieve public encryption keys from PKIs to encrypt messages being sent from the mobile device, (2) the inability to retrieve public keys on received messages that are signed, (3) the inability to deal with very large CRLs on small devices, and (4) the time delay on mobile devices with slower processors to perform complex mathematical calculations involved with public key encryption algorithms. These problems and others result in a poor and frustrating user experience when trying to exchange S/MIME-based e-mail messages using mobile devices.

The pre-processing and post-processing system and method described herein process secure e-mail messages so that such messages, including for example S/MIME messages, can be exchanged with mobile devices. The system and method also leverages the processor power of a host system associated with a mobile device to enable a better user experience when exchanging S/MIME messages with mobile devices.

Figure 17:
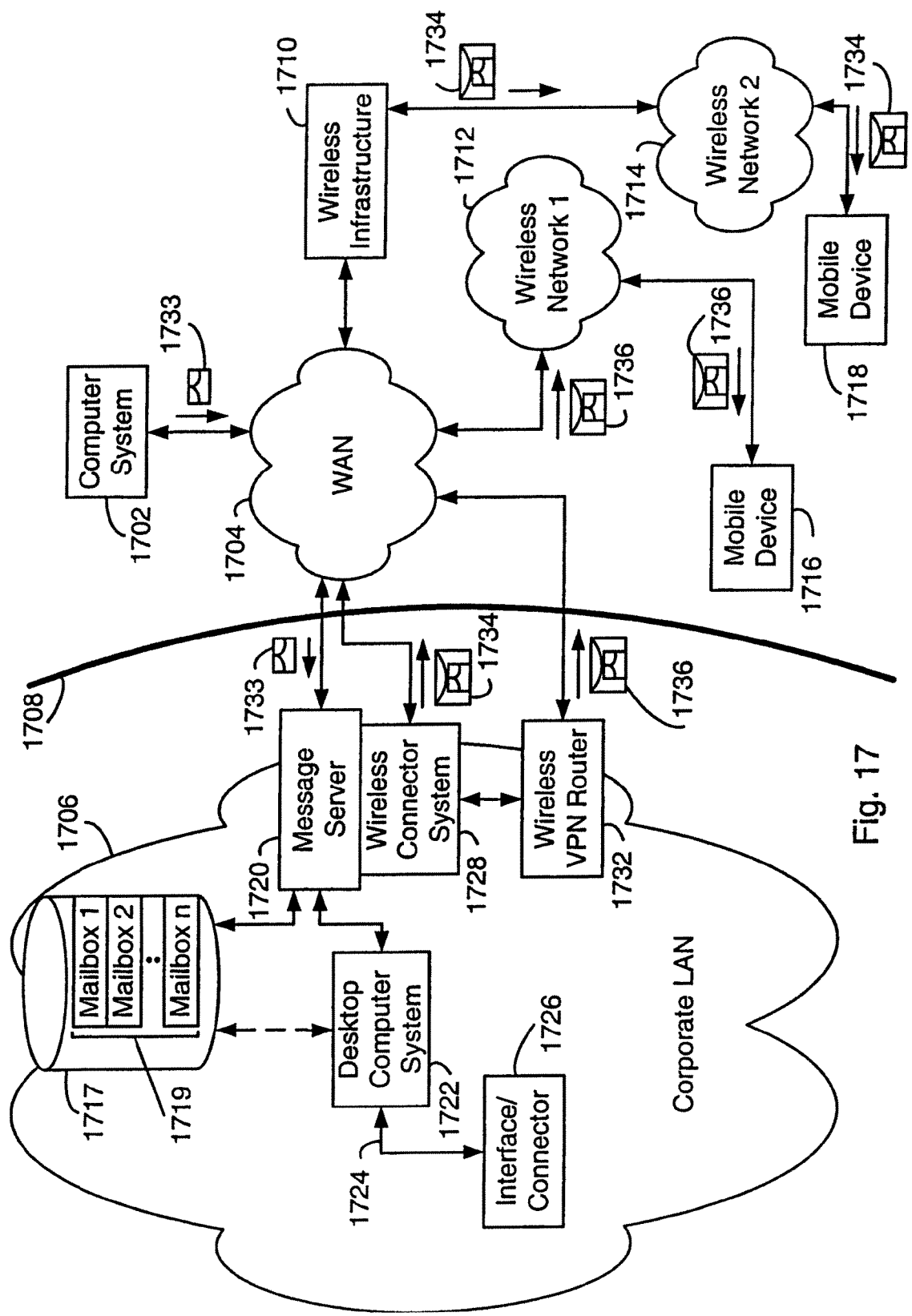
FIG. 17 is a block diagram showing an example communication system.
Figure 18:
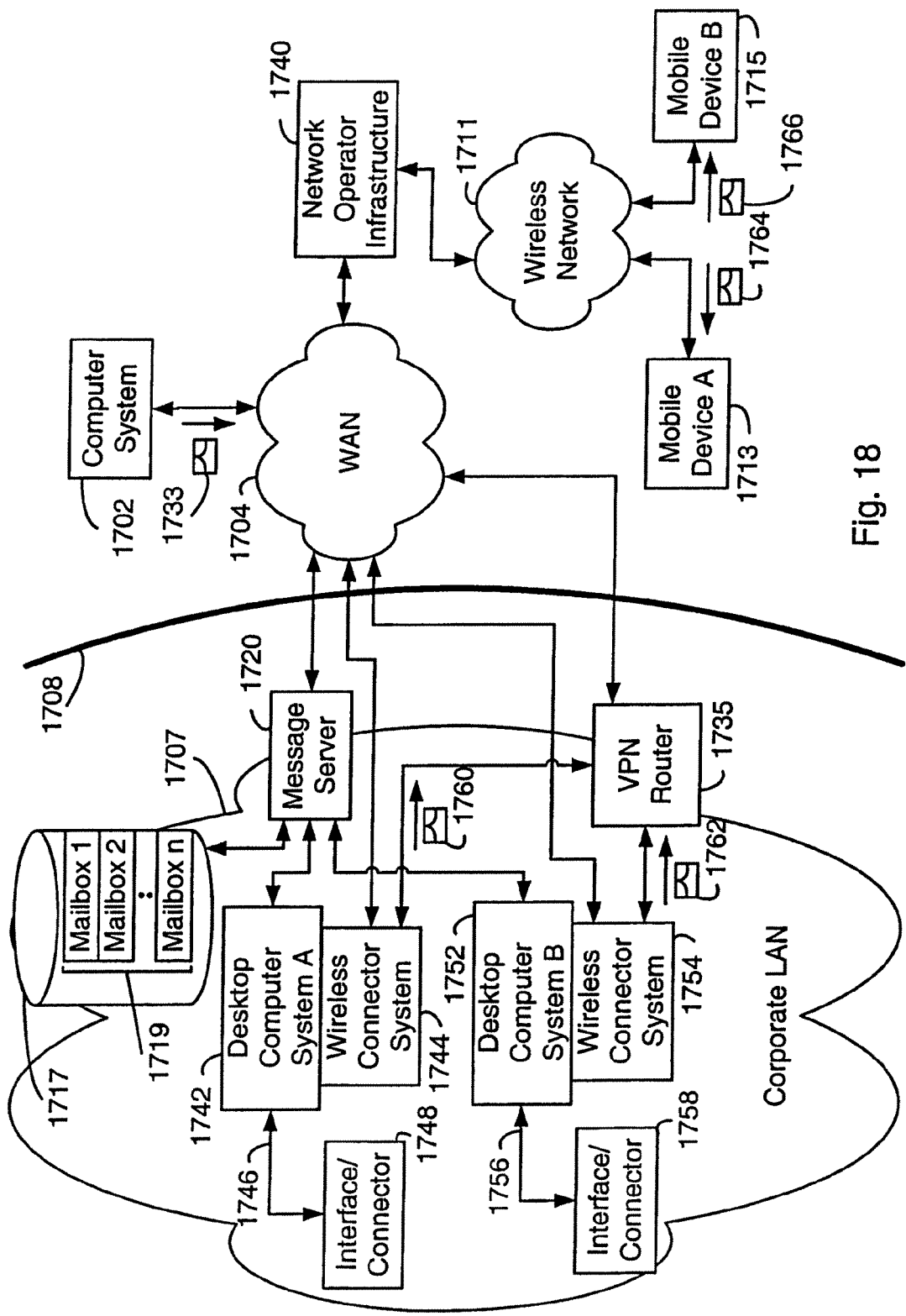
FIG. 18 is a block diagram of an alternative example communication system.
Figure 19:
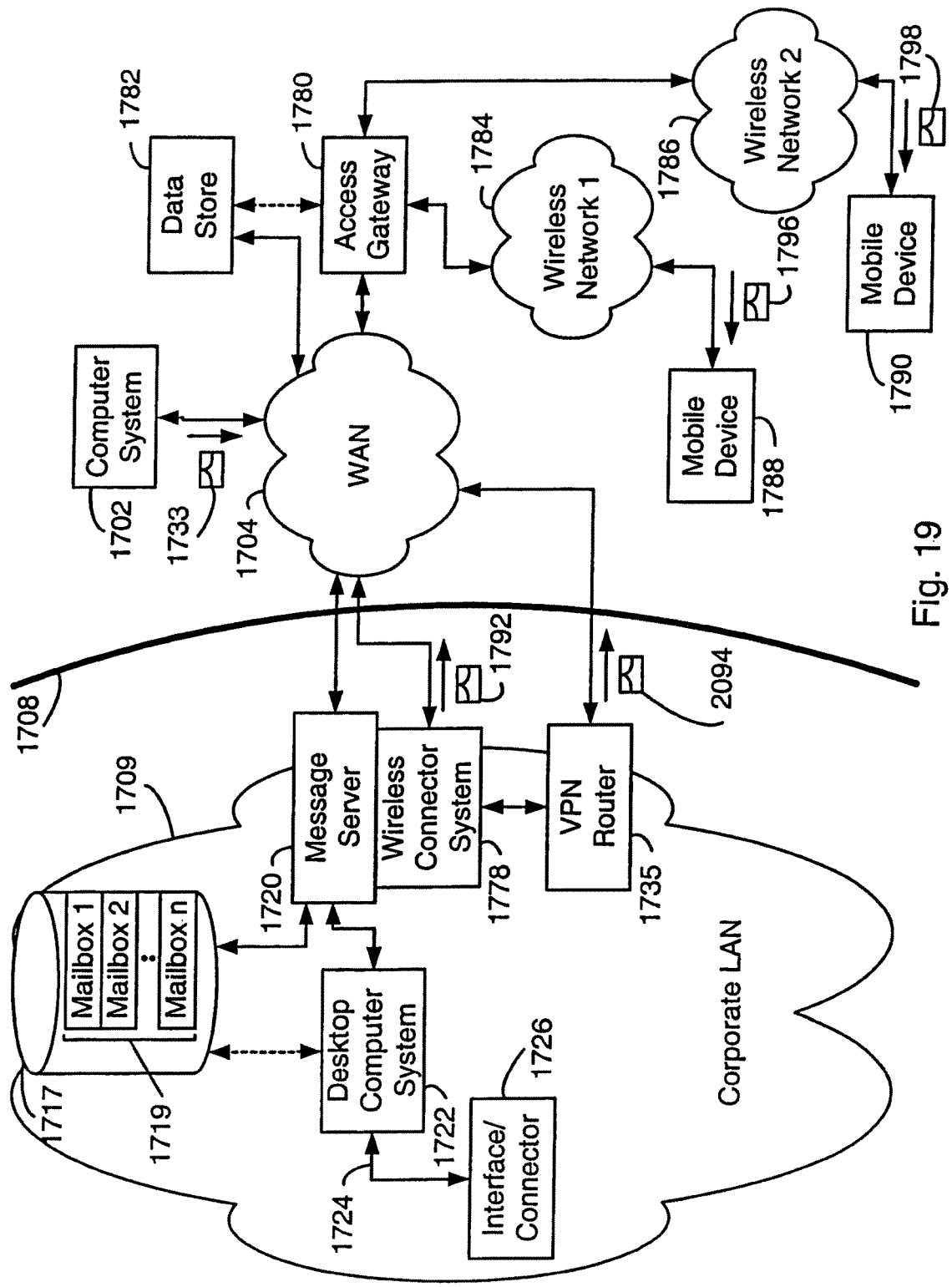
FIG. 19 is a block diagram of another alternative communication system.

Still further examples of the wide scope of the system and method disclosed herein are illustrated in FIGS. 17-19. FIGS. 17-19 describe additional uses of the system and method within different exemplary communication systems. FIG. 17 is a block diagram showing an example communication system. In FIG. 17, there is shown a computer system 1702, a WAN 1704, corporate LAN 1706 behind a security firewall 1708, wireless infrastructure 1710, wireless networks 1712 and 1714, and wireless mobile communication devices ("mobile devices") 1716 and 1718. The corporate LAN 1706 includes a message server 1720, a wireless connector system 1728, a data store 1717 including at least a plurality of mailboxes 1719, a desktop computer system 1722 having a communication link directly to a mobile device such as through physical connection 1724 to an interface or connector 1726, and a wireless Virtual Private Network (VPN) router 1732. Operation of the system in FIG. 17 will be described below with reference to the messages 1733, 1734 and 1736.

The computer system 1702 may, for example, be a laptop, desktop or palmtop computer system configured for connection to the WAN 1704. Such a computer system may connect to the WAN 1704 via an ISP or ASP. Alternatively, the computer system 1702 may be a network-connected computer system that, like the computer system 1722 for example, accesses the WAN 1704 through a LAN or other network. Many modern mobile devices are enabled for connection to a WAN through various infrastructure and gateway arrangements, so that the computer system 1702 may also be a mobile device.

The corporate LAN 1706 is an illustrative example of a central; server-based messaging system that has been enabled for wireless communications. The corporate LAN 1706 may be referred to as a "host system", in that it hosts both a data store 1717 with mailboxes 1719 for messages, as well as possibly further data stores (not shown) for other data, items, that may be sent to or received from mobile devices 1716 and 1718, and the wireless connector system 1728, the wireless VPN router 1732, or possibly other components enabling communications between the corporate LAN 1706 and one or more mobile devices 1716 and 1718. In more general terms, a host system may be one or more computers at, with or in association with which a wireless connector system is operating, as described above. The corporate LAN 1706 is one preferred embodiment of a host system, in which the host system is a server computer running within a corporate network environment operating behind and protected by at least one security communications firewall 1708. Other possible central host systems include ISP, ASP and other service provider or mail systems. Although the desktop computer system 1724 and interface/connector 1726 may be located outside such host systems, wireless communication operations may be similar to those described below.

The corporate LAN 1706 implements the wireless connector system 1728 as an associated wireless communications enabling component, which will normally be a software program, a software application, or a software component built to work with at least one or more message server. The wireless connector system 1728 is used to send user-selected information to, and to receive information from, one or more mobile devices 1716 and 1718, via one or more wireless networks 1712 and 1714. The wireless connector system 1728 may be a separate component of a messaging system, as shown in FIG. 17, or may instead be partially or entirely incorporated into other communication system components. For example, the message server 1720 may incorporate a software program, application, or component implementing the wireless connector system 1728, portions thereof, or some or all of its functionality.

The message server 1720, running on a computer behind the firewall 1708, acts as the main interface for the corporation to exchange messages, including for example email, calendaring data, voice mail, electronic documents, and other personal information management (PIM) data with the WAN 1704, which will typically be the Internet. The particular intermediate operations and computers will be dependent upon the specific type of message delivery mechanisms and networks via which messages are exchanged, and therefore have not been shown in FIG. 17. The functionality of the message server 1720 may extend beyond message sending and receiving, providing such features as dynamic database storage for data like calendars, todo lists, task lists, e-mail and documentation.

Message servers such as 1720 normally maintain a plurality of mailboxes 1719 in one or more data stores such as 1717 for each user having an account on the server. The data store 1717 includes mailboxes 1719 for a number of ("n") user accounts. Messages received by the message server 1720 that identify a user, a user account, a mailbox, or possibly another address associated with a user, account or mailbox 1719 as a message recipient will typically be stored in the corresponding mailbox 1719. If a message is addressed to multiple recipients or a distribution list, then copies of the same message may be stored to more than one mailbox 1719. Alternatively, the message server 1720 may store a single copy of such a message in a data store accessible to all of the users having an account on the message server, and store a pointer or other identifier in each recipient's mailbox 1719. In typical messaging systems, each user may then access his or her mailbox 1719 and its contents using a messaging client such as Microsoft Outlook or Lotus Notes, which normally operates on a PC, such as the desktop computer system 1722, connected in the LAN 1706. Although only one desktop computer system 1722 is shown in FIG. 17, those skilled in the art will appreciate that a LAN will typically contain many desktop, notebook and laptop computer systems. Each messaging client normally accesses a mailbox 1719 through the message server 1720, although in some systems, a messaging client may enable direct access to the data store 1717 and a mailbox 1719 stored thereon by the desktop computer system 1722. Messages may also be downloaded from the data store 1717 to a local data store (not shown) on the desktop computer system 1722.

Within the corporate LAN 1706, the wireless connector system 1728 operates in conjunction with the message server 1720. The wireless connector system 1728 may reside on the same computer system as the message server 1720, or may instead be implemented on a different computer system. Software implementing the wireless connector system 1728 may also be partially or entirely integrated with the message server 1720. The wireless connector system 1728 and the message server 1720 are preferably designed to cooperate and interact to allow the pushing of information to mobile devices 1716, 1718. In such an installation, the wireless connector system 1728 is preferably configured to send information that is stored in one or more data stores associated with the corporate LAN 1706 to one or more mobile devices 1716, 1718, through the corporate firewall 1708 and via the WAN 1704 and one of the wireless networks 1712, 1714. For example, a user that has an account and associated mailbox 1719 in the data store 1717 may also have a mobile device, such as 1716. As described above, messages received by the message server 1720 that identify a user, account or mailbox 1719 are stored to a corresponding mailbox 1719 by the message server 1720. If a user has a mobile device, such as 1716, messages received by the message server 1720 and stored to the user's mailbox 1719 are preferably detected by the wireless connector system 1728 and sent to the user's mobile device 1716. This type of functionality represents a "push" message sending technique. The wireless connector system 1728 may instead employ a "pull" technique, in which items stored in a mailbox 1719 are sent to a mobile device 1716, 1718 responsive to a request or access operation made using the mobile device, or some combination of both techniques.

The use of a wireless connector 1728 thereby enables a messaging system including a message server 1720 to be extended so that each user's mobile device 1716, 1718 has access to stored messages of the message server 1720.

As shown in FIG. 17, and similar to the system of FIG. 1, there are several paths for exchanging information with a mobile device 1716, 1718 from the corporate LAN 1706. One possible information transfer path is through the physical connection 1724 such as a serial port, using an interface or connector 1726. This path may be useful for example for transfer of bulky PIM and signature-related information, data synchronization, and private encryption or signature key transfers, as described above. In known "synchronization" type wireless messaging systems, a physical path has also been used to transfer messages from mailboxes 1719 associated with a message server 1720 to mobile devices 1716 and 1718.

Another method for data exchange with a mobile device 1716, 1718 is over-the-air, through the wireless connector system 1728 and using wireless networks 1712, 1714. As shown in FIG. 17, this could involve a Wireless VPN router 1732 or a traditional WAN connection to wireless infrastructure 1710 that provides an interface to one or more wireless networks 1712, 1714. The Wireless VPN router 1732 provides for creation of a VPN connection directly through a specific wireless network 1712 to a wireless device 1716. A primary advantage of using a wireless VPN router 1732 is that it could be an off-the-shelf VPN component which would not require wireless infrastructure 1710.

If a wireless VPN router 1732 is not available, then a link to a WAN 1704, normally the Internet, is a commonly used connection mechanism that may be employed by the wireless connector system 1728. To handle the addressing of the mobile device 1716 and any other required interface functions, wireless infrastructure 1710 is preferably used.

In some implementations, more than one over-the-air information exchange mechanism may be provided in the corporate LAN 1706. In the exemplary communication system of FIG. 17 for example, mobile devices 1716, 1718 associated with users having mailboxes 1719 associated with user accounts on the message server 1720 are configured to operate on different wireless networks 1712 and 1714. If the wireless network 1712 supports IPv6 addressing, then the wireless VPN router 1732 may be used by the wireless connector system 1728 to exchange data with any mobile device 1716 operating within the wireless network 1712. The wireless network 1714 may be a different type of wireless network, however, such as the Mobitex network, in which case information may instead be exchanged with a mobile device 1718 operating within, the wireless network 1714 by the wireless connector system 1728 via a connection to the WAN 1704 and the wireless infrastructure 1710.

Operation of the system in FIG. 17 is similar to that of FIG. 1, described above. An e-mail message 1733 sent from the computer system 1702 and addressed to at least one recipient having both an account and mailbox 1719 or like data store associated with the message server 1720 and a mobile device 1716 or 1718. However, the e-mail message 1733 is intended for illustrative purposes only. The exchange of other types of information between the corporate LAN 1706 is preferably also enabled by the wireless connector system 1728.

The e-mail message 1733, sent from the computer system 1702 via the WAN 1704, may be fully in the clear, or signed with a digital signature and/or encrypted, depending upon the particular messaging scheme used. For example, if the computer system 1702 is enabled for secure messaging using S/MIME, then the e-mail message 1733 may be signed, encrypted, or both.

The e-mail message 1733 arrives at the message server 1720, which determines into which mailboxes 1719 the e-mail message 1733 should be stored. As described above, a message such as the e-mail message 1733 may include a user name, a user account, a mailbox identifier, or other type of identifier that may be mapped to a particular account or associated mailbox 1719 by the message server 1720. For an e-mail message 1733, recipients are typically identified using e-mail addresses corresponding to a user account and thus a mailbox 1719.

The wireless connector system 1728 sends or mirrors, via a wireless network 1712 or 1714, certain user-selected data items or parts of data items from the corporate LAN 1706 to the user's mobile device 1716 or 1718, preferably upon detecting that one or more triggering events has occurred. A triggering event includes, but is not limited to, one or more of the following: screen saver activation at a user's networked computer system 1722, disconnection of the user's mobile device 1716 or 1718 from the interface 1726, or receipt of a command sent from a mobile device 1716 or 1718 to the host system to start sending one or more messages stored at the host system. Thus, the wireless connector system 1728 may detect triggering events associated with the message server 1720, such as receipt of a command, or with one or more networked computer systems 1722, including the screen saver and disconnection events described above. When wireless access to corporate data for a mobile device 1716 or 1718 has been activated at the LAN 1706, for example when the wireless connector system 1728 detects the occurrence of a triggering event for a mobile device user, data items selected by the user are preferably sent to the user's mobile device. In the example of the e-mail message 1733, assuming that a triggering event has been detected, the arrival of the message 1733 at the message server 1720 is detected by the wireless connector system 1728. This may be accomplished, for example, by monitoring or querying mailboxes 1719 associated with the message server 1720, or, if the message server 1720 is a Microsoft Exchange server, then the wireless connector system 1728 may register for advise syncs provided by the Microsoft Messaging Application Programming Interface (MAPI) to thereby receive notifications when a new message is stored to a mailbox 1719.

When a data item such as the e-mail message 1733 is to be sent to a mobile device 1716 or 1718, the wireless connector system 1728 preferably repackages the data item, as indicated at 1734 and 1736. Repackaging techniques may be similar for any available transfer paths or may be dependent upon the particular transfer path, either the wireless infrastructure 1710 or the wireless VPN router 1732. For example, the e-mail message 1733 is preferably compressed and encrypted, either before or after being repackaged at 1734, to thereby effectively provide for secure transfer to the mobile device 1718. Compression reduces the bandwidth required to send the message, whereas encryption ensures confidentiality of any messages or other information sent to mobile devices 1716 and 1718. In contrast, messages transferred via a VPN router 1732 might only be compressed and not encrypted, since a VPN connection established by the VPN router 1732 is inherently secure. Messages are thereby securely sent, via either encryption at the wireless connector system 1728, which may be considered a non-standard VPN tunnel or a VPN-like connection for example, or the VPN router 1732, to mobile devices 1716 and 1718. Accessing messages using a mobile device 1716 or 1718 is thus no less secure than accessing mailboxes at the LAN 1706 using the desktop computer system 1722.

When a repackaged message 1734 or 1736 arrives at a mobile device 1716 or 1718, via the wireless infrastructure 1710, or via the wireless VPN router 1732, the mobile device 1716 or 1718 removes the outer electronic envelope from the repackaged message 1734 or 1736, and performs any required decompression and decryption operations. Messages sent from a mobile device 1716 or 1718 and addressed to one or more recipients are preferably similarly repackaged, and possibly compressed and encrypted, and sent to a host system such as the LAN 1706. The host system may then remove the electronic envelope from the repackaged message, decrypt and decompress the message if desired, and route the message to the addressed recipients.

FIG. 18 is a block diagram of an alternative exemplary communication system, in which wireless communications are enabled by a component associated with an operator of a wireless network. As shown in FIG. 18, the system includes a computer system 1702, WAN 1704, a corporate LAN 1707 located behind a security firewall 1708, network operator infrastructure 1740, a wireless network 1711, and mobile devices 1713 and 1715. The computer system 1702, WAN 1704, security firewall 1708, message server 1720, data store 1717, mailboxes 1719, and VPN router 1735 are substantially the same as the similarly-labelled components in FIG. 17. However, since the VPN router 1735 communicates with the network operator infrastructure 1740, it need not necessarily be a wireless VPN router in the system of FIG. 18. The network operator infrastructure 1740 enables wireless information exchange between the LAN 1707 and mobile devices 1713, 1715, respectively associated with the computer systems 1742 and 1752 and configured to operate within the wireless network 1711. In the LAN 1707, a plurality of desktop computer systems 1742, 1752 are shown, each having a physical connection 1746, 1756 to an interface or connector 1748, 1758. A wireless connector system 1744, 1754 is operating on or in conjunction with each computer system 1742, 1752.

The wireless connector systems 1744, 1754 are similar to the wireless connector system 1728 described above, in that it enables data items, such as e-mail messages and other items that are stored in mailboxes 1719, and possibly data items stored in a local or network data store, to be sent from the LAN 1707 to one or more mobile devices 1713, 1715. In FIG. 18 however, the network operator infrastructure 1740 provides an interface between the mobile devices 1713, 1715 and the LAN 1707. As above, operation of the system shown in FIG. 18 will be described below in the context of an e-mail message as an illustrative example of a data item that may be sent to a mobile device 1713, 1715.

When an e-mail message 1733, addressed to one or more recipients having an account on the message server 1720, is received by the message server 1720, the message, or possibly a pointer to a single copy of the message stored in a central mailbox or data store, is stored into the mailbox 1719 of each such recipient. Once the e-mail message 1733 or pointer has been stored to a mailbox 1719, it may preferably be accessed using a mobile device 1713 or 1715. In the example shown in FIG. 18, the e-mail message 1733 has been addressed to the mailboxes 1719 associated with both desktop computer systems 1742 and 1752 and thus both mobile devices 1713 and 1715.

As those skilled in the art will appreciate, communication network protocols commonly used in wired networks such as the LAN 1707 and/or the WAN 1704 are not suitable or compatible with wireless network communication protocols used within wireless networks such as 1711. For example, communication bandwidth, protocol overhead and network latency, which are primary concerns in wireless network communications, are less significant in wired networks, which typically have much higher capacity and speed than wireless networks. Therefore, mobile devices 1713 and 1715 cannot normally access the data store 1717 directly. The network operator infrastructure 1740 provides a bridge between the wireless network 1711 and the LAN 1707.

The network operator infrastructure 1740 enables a mobile device 1713, 1715 to establish a connection to the LAN 1707 through the WAN 1704, and may, for example, be operated by an operator of the wireless network 1711 or a service provider that provides wireless communication service for mobile devices 1713 and 1715. In a pull-based system, a mobile device 1713, 1715 may establish a communication session with the network operator infrastructure 1740 using a wireless network compatible communication scheme, preferably a secure, scheme such as Wireless Transport Layer Security (WTLS) when information should remain confidential, and a wireless web browser such as a Wireless Application Protocol (WAP) browser. A user may then request (through manual selection or pre-selected defaults in the software residing in the mobile device) any or all information, or just new information for example, stored in a mailbox 1719 in the data store 1717 at the LAN 1707. The network operator infrastructure 1740 then establishes a connection or session with a wireless connector system 1744, 1754, using Secure Hypertext Transfer Protocol (HTTPS) for example, if no session has already been established. As above, a session between the network operator infrastructure 1740 and a wireless connector system 1744, 1754 may be made via a typical WAN connection or through the VPN router 1735 if available. When time delays between receiving a request from a mobile device 1713, 1715 and delivering requested information back to the device are to be minimized, the network operator infrastructure 1740 and the wireless connector systems 1744, 1754 may be configured so that a communication connection remains open once established.

In the system of FIG. 18, requests originating from mobile device A 1713 and B 1715 would be sent to the wireless connector systems 1744 and 1754, respectively. Upon receiving a request for information from the network operator infrastructure 1740, a wireless connector system 1744, 1754 retrieves requested information from a data store. For the e-mail message 1733, the wireless connector system 1744, 1754 retrieves the e-mail message 1733 from the appropriate mailbox 1719, typically through a messaging client operating in conjunction with the computer system 1742, 1752, which may access a mailbox 1719 either via the message server 1720 or directly. Alternatively, a wireless connector system 1744, 1754 may be configured to access mailboxes 1719 itself, directly or through the message server 1720. Also, other data stores, both network data stores similar to the data store 1717 and local data stores associated with each computer system 1742, 1752, may be accessible to a wireless connector system 1744, 1754, and thus to a mobile device 1713, 1715.

If the e-mail message 1733 is addressed to the message server accounts or mailboxes 1719 associated with both computer systems 1742 and 1752 and devices 1713 and 1715, then the e-mail message 1733 may be sent to the network operator infrastructure 1740 as shown at 1760 and 1762, which then sends a copy of the e-mail message to each mobile device 1713 and 1715, as indicated at 1764 and 1766. Information may be transferred between the wireless connector systems 1744, 1754 and the network operator infrastructure 1740 via either a connection to the WAN 1704 or the VPN router 1735. When the network operator infrastructure 1740 communicates with the wireless connector systems 1744, 1754 and the mobile devices 1713, 1715 via different protocols, translation operations may be performed by the network operator infrastructure 1740. Repackaging techniques may also be used between the wireless connector systems 1744, 1754 and the network operator infrastructure 1740, and between each mobile device 1713, 1715 and the network operator infrastructure 1740.

Messages or other information to be sent from a mobile device 1713, 1715 may be processed in a similar manner, with such information first being transferred from a mobile device 1713, 1715 to the network operator infrastructure 1740. The network operator infrastructure 1740 may then send the information to a wireless connector system 1744, 1754 for storage in a mailbox 1719 and delivery to any addressed recipients by the message server 1720 for example, or may alternatively deliver the information to the addressed recipients.

The above description of the system in FIG. 18 relates to pull-based operations. The wireless connector systems 1744, 1754 and the network operator infrastructure may instead be configured to push data items to mobile devices 1713 and 1715. A combined push/pull system is also possible. For example, a notification of a new message or a list of data items currently stored in a data store at the LAN 1707 could be pushed to a mobile device 1713, 1715, which may then be used to request messages or data items from the LAN 1707 via the network operator infrastructure 1740.

If mobile devices associated with user accounts on the LAN 1707 are configured to operate within different wireless networks, then each wireless network may have an associated wireless network infrastructure component similar to 1740.

Although separate, dedicated wireless connector systems 1744, 1754 are shown for each computer system 1742, 1752 in the system of FIG. 18, one or more of the wireless connector systems 1744, 1754 may preferably be configured to operate in conjunction with more than one computer system 1742, 1752, or to access a data store or mailbox 1719 associated with more than one computer system. For example, the wireless connector system 1744 may be granted access to the mailboxes 1719 associated with both the computer system 1742 and the computer system 1752. Requests for data items from either mobile device A 1713 or B 1715 may then be processed by the wireless connector system 1744. This configuration may be useful to enable wireless communications between the LAN 1707 and the mobile devices 1713 and 1715 without requiring a desktop computer system 1742, 1752 to be running for each mobile device user. A wireless connector system may instead be implemented in conjunction with the message server 1720 to enable wireless communications.

FIG. 19 is a block diagram of another alternative communication system. The system includes a computer system 1702, WAN 1704, a corporate LAN 1709 located behind a security firewall 1708, an access gateway 1780, data store 1782, wireless networks 1784 and 1786, and mobile devices 1788 and 1790. In the LAN 1709, the computer system 1702, WAN 1704, security firewall 1708, message server 1720, data store 1717, mailboxes 1719, desktop computer system 1722, physical connection 1724, interface or connector 1726 and VPN router 1735 are substantially the same as the corresponding components described above. The access gateway 1780 and data store 1782 provide mobile devices 1788 and 1790 with access to data items stored at the LAN 1709. In FIG. 19, a wireless connector system 1778 operates on or in conjunction with the message server 1720, although a wireless connector system may instead operate on or in conjunction with one or more desktop computer systems in the LAN 1709.

The wireless connector system 1778 provides for transfer of data items stored at the LAN 1709 to one or more mobile devices 1788, 1790. These data items preferably include e-mail messages stored in mailboxes 1719 in the data store 1717, as well as possibly other items stored in the data store 1717 or another network data store or a local data store of a computer system such as 1722.

As described above, an e-mail message 1733 addressed to one or more recipients having an account on the message server 1720 and received by the message server 1720 may be stored into the mailbox 1719 of each such recipient. In the system of FIG. 19, the external data store 1782 preferably has a similar structure to, and remains synchronized with, the data store 1717. PIM information or data stored at data store 1782 preferably is independently modifiable to the PIM information or data stored at the host system. In this particular configuration, the independently modifiable information at the external data store 1782 may maintain synchronization of a plurality of data stores associated with a user (i.e., data on a mobile device, data on a personal computer at home, data at the corporate LAN, etc.). This synchronization may be accomplished, for example, through updates sent to the data store 1782 by the wireless connector system 1778 at certain time intervals, each time an entry in the data store 1717 is added or changed, at certain times of day, or when initiated at the LAN 1709, by the message server 1720 or a computer system 1722, at the data store 1782, or possibly by a mobile device 1788, 1790 through the access gateway 1780. In the case of the e-mail message 1733 for example, an update sent to the data store 1782 some time after the e-mail message 1733 is received may indicate that the message 1733 has been stored in a certain mailbox 1719 in the store 1717, and a copy of the e-mail message will be stored to a corresponding storage area in the data store 1782. When the e-mail message 1733 has been stored in the mailboxes 1719 corresponding to the mobile devices 1788 and 1790 for example, one or more copies of the e-mail message, indicated at 1792 and 1794 in FIG. 19, will be sent to and stored in corresponding storage areas or mailboxes in the data store 1782. As shown, updates or copies of stored information in the data store 1717 may be sent to the data store 1782 via a connection to the WAN 1704 or the VPN muter 1735. For example, the wireless connector system 1778 may post updates or stored information to a resource in the data store 1782 via an HTTP post request. Alternatively, a secure protocol such as HTTPS or Secure Sockets Layer (SSL) may be used. Those skilled in the art will appreciate that a single copy of a data item stored in more than one location in a data store at the LAN 1709 may instead be sent to the data store 1782. This copy of the data item could then be stored either in more than one corresponding location in the data store 1782, or a single copy may be stored in the data store 1782, with a pointer or other identifier of the stored data item being stored in each corresponding location in the data store 1782.

The access gateway 1780 is effectively an access platform, in that it provides mobile devices 1788 and 1790 with access to the data store 1782. The data store 1782 may be configured as a resource accessible on the WAN 1704, and the access gateway 1780 may be an ISP system or WAP gateway through which mobile devices 1788 and 1790 may connect to the WAN 1704. A WAP browser or other browser compatible with the wireless networks 1784 and 1786 may then be used to access the data store 1782, which is synchronized with the data store 1717, and download stored data items either automatically or responsive to a request from a mobile device 1788, 1790. As shown at 1796 and 1798, copies of the e-mail message 1733, which was stored in the data store 1717, may be sent to the mobile devices 1788 and 1790. A data store (not shown) on each mobile device 1788, 1790 may thereby be synchronized with a portion, such as a mailbox 1719, of a data store 1717 on a corporate LAN 1709. Changes to a mobile device data store may similarly be reflected in the data stores 1782 and 1717.

The invention claimed is:

1. A method of processing an encoded message at a host system, the method comprising:
   receiving the encoded message addressed to a plurality of message receivers; and
   for each message receiver that has a corresponding wireless mobile communication device:
      generating a processed encoded message by removing a session key from the encoded message that is unrelated to the wireless mobile communication device to which the encoded message is to be transmitted; and
      transmitting the processed encoded message to the corresponding wireless mobile communication device.

2. The method of claim 1, wherein the received encoded message comprises an S/MIME (Secure Multipurpose Internet Mail Extensions) encrypted message.

3. The method of claim 1, wherein the received encoded message comprises a PGP (Pretty Good Privacy) encrypted message.

4. The method of claim 1, wherein the step of generating a processed encoded message further comprises removing a RecipientInfo list from the encoded message.

5. The method of claim 1, wherein the processed encoded message comprises a new message that has been generated from the encoded message based upon at least one encryption aspect.

6. The method of claim 1, wherein:
the step of generating a processed encoded message comprises decrypting the encoded message; and
the decrypted message is used to generate the processed encoded message that is to be transmitted to the wireless mobile communication device.

7. The method of claim 1, wherein:
the encoded message includes an encrypted session key for each of the plurality of message receivers; and
the method further comprises the steps of, for each message receiver that has a corresponding wireless mobile communication device:
generating an intermediary message for the wireless mobile communication device with only the encrypted session key for the corresponding wireless mobile communication device;
transmitting the intermediary message to the wireless mobile communication device so that the session key may be decrypted at the wireless mobile communication device and transmitted to the host system, wherein the decrypted session key is received by the host system;
decrypting the encoded message using the decrypted session key; and
transmitting the decrypted encoded message to the wireless mobile communication device.

8. The method of claim 1, wherein:
the received encoded message comprises an encrypted message body; and
the processed encoded message sent to the wireless mobile communications device comprises substantially all of the encrypted message body.

9. The method of claim 1, wherein redirection means is used in said determining step.

10. A computer-implemented system for processing an encoded message at a host system, the system comprising:
a data processor;
a computer-readable memory encoded with instructions for commanding the data processor to execute steps comprising:
receiving the encoded message addressed to a plurality of message receivers; and
for each message receiver that has a corresponding wireless mobile communication device:
generating a processed encoded message by removing a session key from the encoded message that is unrelated to the wireless mobile communication device to which the encoded message is to be transmitted; and
transmitting the processed encoded message to the corresponding wireless mobile communication device.

11. The system of claim 10, wherein the received encoded message comprises an S/MIME (Secure Multipurpose Internet Mail Extensions) encrypted message.

12. The system of claim 10, wherein the received encoded message comprises a PGP (Pretty Good Privacy) encrypted message.

13. The system of claim 10, wherein the step of generating a processed encoded message further comprises removing a RecipientInfo list from the encoded message.

14. The system of claim 10, wherein the processed encoded message comprises a new message that has been generated from the encoded message based upon at least one encryption aspect.

15. The system of claim 10, wherein:
the step of generating a processed encoded message comprises decrypting the encoded message; and
the decrypted message is used to generate the processed encoded message that is to be transmitted to the wireless mobile communication device.

16. The system of claim 10, wherein:
the encoded message includes an encrypted session key for each of the plurality of message receivers; and
the method further comprises the steps of, for each message receiver that has a corresponding wireless mobile communication device:
generating an intermediary message for the wireless mobile communication device with only the encrypted session key for the corresponding wireless mobile communication device;
transmitting the intermediary message to the wireless mobile communication device so that the session key may be decrypted at the wireless mobile communication device and transmitted to the host system, wherein the decrypted session key is received by the host system;
decrypting the encoded message using the decrypted session key; and
transmitting the decrypted encoded message to the wireless mobile communication device.

17. The system of claim 10, wherein:
the received encoded message comprises an encrypted message body; and
the processed encoded message sent to the wireless mobile communications device comprises substantially all of the encrypted message body.

18. The system of claim 10, wherein redirection means is used in said determining step.

19. Computer-readable storage medium or mediums encoded with instructions that cause a processor to perform a method for processing an encoded message at a host system, said method comprising:
receiving the encoded message addressed to a plurality of message receivers; and
for each message receiver that has a corresponding wireless mobile communication device:
generating a processed encoded message by removing a session key from the encoded message that is unrelated to the wireless mobile communication device to which the encoded message is to be transmitted; and
transmitting the processed encoded message to the corresponding wireless mobile communication device.

20. A computer-implemented system for processing an encoded message at a host system, the system comprising:
means for receiving the encoded message addressed to a plurality of message receivers; and
for each message receiver that has a corresponding wireless mobile communication device:
means for generating a processed encoded message by removing a session key from the encoded message that is unrelated to the wireless mobile communication device to which the encoded message is to be transmitted; and means for transmitting the processed encoded message to the corresponding wireless mobile communication device.

\* \* \* \* \*